United States Patent
Guan et al.

(10) Patent No.: US 10,671,454 B2
(45) Date of Patent: *Jun. 2, 2020

(54) SYSTEM AND METHOD FOR BLOCKCHAIN-BASED NOTIFICATION

(71) Applicant: ALIBABA GROUP HOLDING LIMITED, Grand Cayman (KY)

(72) Inventors: Yayang Guan, Hangzhou (CN); Rubing Shi, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,405

(22) Filed: Dec. 20, 2019

(65) Prior Publication Data
US 2020/0125427 A1  Apr. 23, 2020

Related U.S. Application Data

(63) Continuation of application No. PCT/CN2019/102885, filed on Aug. 27, 2019.

(51) Int. Cl.
*G06F 9/54* (2006.01)
*H04L 9/06* (2006.01)
*G06F 9/48* (2006.01)

(52) U.S. Cl.
CPC ............ *G06F 9/542* (2013.01); *G06F 9/4868* (2013.01); *H04L 9/0637* (2013.01)

(58) Field of Classification Search
None
See application file for complete search history.

(56) References Cited

U.S. PATENT DOCUMENTS

| 10,095,549 | B1 | 10/2018 | Needham et al. |
| 10,310,824 | B2 | 6/2019 | Eksten et al. |
| 10,361,853 | B2 | 7/2019 | Castagna et al. |
| 2006/0074704 | A1 | 4/2006 | Shukla et al. |
| 2012/0227044 | A1 | 9/2012 | Arumugham et al. |
| 2018/0005186 | A1* | 1/2018 | Hunn ................. G06Q 30/0283 |
| 2018/0039667 | A1 | 2/2018 | Pierce et al. |
| 2018/0082043 | A1 | 3/2018 | Witchey et al. |

(Continued)

OTHER PUBLICATIONS

Non-Final Office Action for U.S. Appl. No. 16/722,457 dated Feb. 19, 2020.

(Continued)

*Primary Examiner* — Umut Onat
(74) *Attorney, Agent, or Firm* — Sheppard Mullin Richter & Hampton LLP

(57) ABSTRACT

Methods, systems, and apparatus, including computer programs encoded on computer storage media, for blockchain-based notification are provided. One of the methods includes: obtaining information in a block of a blockchain to determine a current state of a workflow, wherein a blockchain contract deployed in the blockchain is executable to update the current state among one or more states of the workflow; updating a locally-maintained state machine based on the determined current state; and in response to determining that the updated state machine corresponds to one of the one or more states, transmitting a notification message to one or more subscribers subscribing to the one state.

18 Claims, 11 Drawing Sheets

(56) References Cited

U.S. PATENT DOCUMENTS

| | | | |
|---|---|---|---|
| 2018/0096752 A1 | 4/2018 | Ovalle | |
| 2018/0101848 A1 | 4/2018 | Castagna et al. | |
| 2018/0157825 A1 | 6/2018 | Eksten et al. | |
| 2018/0227275 A1 | 8/2018 | Russinovich et al. | |
| 2018/0285996 A1 | 10/2018 | Ma | |
| 2019/0123889 A1 | 4/2019 | Schmidt-Karaca | |
| 2019/0147532 A1 | 5/2019 | Singh et al. | |
| 2019/0205884 A1* | 7/2019 | Batra | G06Q 10/0633 |
| 2019/0228133 A1 | 7/2019 | Ansari et al. | |
| 2019/0251199 A1 | 8/2019 | Klianev | |
| 2019/0251489 A1 | 8/2019 | Berti et al. | |
| 2019/0251566 A1 | 8/2019 | Pan et al. | |
| 2019/0303932 A1 | 10/2019 | Klaedtke | |
| 2019/0356471 A1 | 11/2019 | Vaughn et al. | |
| 2019/0392178 A1 | 12/2019 | Rice | |
| 2020/0007322 A1 | 1/2020 | Weldemariam et al. | |

OTHER PUBLICATIONS

Lopez-Pintado et al, "Caterpillar: A Business Process Execution Engine on the Ethereum Blockchain", arXiv, Pre Print on Jul. 2018, 32 pages.

Sun et al., "Developing a Workflow Design Framework based on dataflow analysis", IEEE, 2008, 10 pages.

Non-Final Office Action for U.S. Appl. No. 16/722,487 dated Feb. 6, 2020.

Non-Final Office Action for U.S. Appl. No. 16/722,372 dated Mar. 20, 2020.

\* cited by examiner

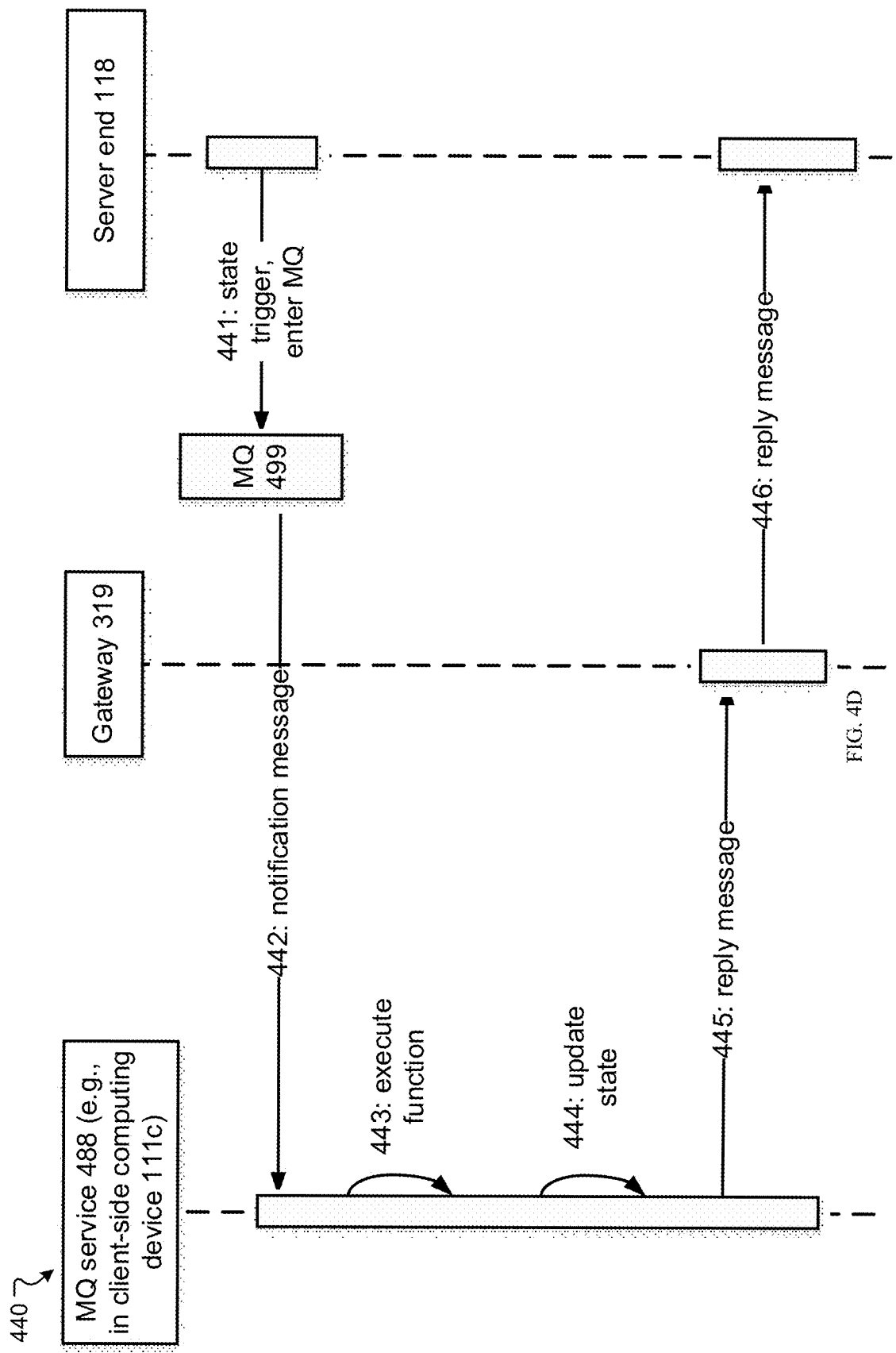

510

511: obtaining information in a block of a blockchain to determine a current state of a workflow, wherein a blockchain contract deployed in the blockchain is executable to update the current state among one or more states of the workflow

512: updating a locally-maintained state machine based on the determined current state

513: in response to determining that the updated state machine corresponds to one of the one or more states, transmitting a notification message to one or more subscribers subscribing to the one state

FIG. 5

SYSTEM AND METHOD FOR BLOCKCHAIN-BASED NOTIFICATION

CROSS REFERENCE TO RELATED APPLICATION

The present application is a continuation application of International Patent Application No. PCT/CN2019/102885, filed on Aug. 27, 2019, and entitled "SYSTEM AND METHOD FOR BLOCKCHAIN-BASED NOTIFICATION", the entire contents of which are incorporated herein by reference.

TECHNICAL FIELD

This application generally relates to systems and methods for blockchain-based notification.

BACKGROUND

Workflow management is often tedious and inefficient. For example, when a number of different parties are involved in a workflow to manage different stages of the workflow, one party may need to be informed of the completion of a preceding stage in order to commence its own stage. It is however often unreliable and inefficient to delegate the task of notification among the parties themselves. And with an increase of the number of parties or complexity of the workflow, the chance of error will multifold. Further, significant resources are required for ensuring accurate and timely notifications for such workflow. Thus, it is desirable to develop efficient and reliable systems and methods to improve workflow management.

Blockchain provides data storage in a decentralized fashion by keeping the data in a series of data blocks having precedence relationship between each other. The chain of blocks is maintained and updated by a network of blockchain nodes, which are also responsible for validating data under a consensus scheme. The stored data may include many data types, such as purchase order status, financial transactions among parties, historical access information, etc.

Blockchain can be maintained and updated by adding blocks of blockchain transactions. To store data to blockchain, the data may be included in the blockchain transactions to add to new blocks of the blockchain. Additionally, many blockchains (e.g., the Ethereum blockchain) have enabled blockchain contracts (also referred to as smart contracts) that are executable through blockchain transactions. For example, blockchain transactions may comprise signed messages originated by externally owned accounts (e.g., blockchain accounts), transmitted by the blockchain network, and recorded in the blockchain. Blockchain contracts may be executed to achieve programmed functions.

SUMMARY

Various embodiments of the specification include, but are not limited to, systems, methods, and non-transitory computer readable media for blockchain-based notification.

According to some embodiments, a computer-implemented method for blockchain-based notification comprises: obtaining information in a block of a blockchain to determine a current state of a workflow, wherein a blockchain contract deployed in the blockchain is executable to update the current state among one or more states of the workflow; updating a locally-maintained state machine based on the determined current state; and in response to determining that the updated state machine corresponds to one of the one or more states, transmitting a notification message to one or more subscribers subscribing to the one state.

In some embodiments, obtaining the information in the block of the blockchain to determine the current state of the workflow comprises: obtaining a blockchain transaction in one or more blocks of the blockchain, wherein the blockchain transaction triggers execution of the blockchain contract to update the current state of the workflow; and determining the current state of the workflow according to the obtained blockchain transaction.

In some embodiments, before obtaining the information in the block of the blockchain to determine the current state of the workflow, the method further comprises: obtaining a reply message indicating completion of a preceding state among the one or more states.

In some embodiments, before obtaining the information in the block of the blockchain to determine the current state of the workflow, the method further comprises: obtaining an update of a preceding state of the one state; generating a blockchain transaction for updating the preceding state; and transmitting the blockchain transaction to one or more blockchain nodes to add to the blockchain and cause the current state of the workflow to update to the one state.

In some embodiments, the notification message includes a result returned from completion of a preceding state among the one or more state and a result returned from completion of a preceding state among the one or more states.

In some embodiments, the locally-maintained state machine comprises one or more local states respectively mapped to the one or more states of the workflow.

In some embodiments, the one or more local states are configured in a cyclic trigger flow; and the cyclic trigger flow starts with a starting local state of the one or more local states, passes through each of the one or more local states once in one direction till an ending local state, and returns to the starting local state.

In some embodiments, the one or more states are configured in another cyclic trigger flow; the another cyclic trigger flow starts with a starting state of the one or more states, passes through each of the one or more states once in one direction till an ending state, and returns to the starting state; each of the one or more states is triggered by completion of a preceding state in the another cyclic trigger flow; the starting local state is mapped to the starting state; and before obtaining the information in the block of the blockchain to determine the current state of the workflow, the method further comprises executing the blockchain contract to initiate the current state to be the starting state.

In some embodiments, the method further comprises: obtaining a request for deactivating the one state; and in response to the request for deactivating the one state: generating a blockchain transaction for shortcutting the one state from the another cyclic trigger flow, and transmitting the generated blockchain transaction to one or more blockchain nodes to add to the blockchain; and shortcutting a local state mapped to the one state from the cyclic trigger flow.

In some embodiments, the method further comprises: obtaining a request for reactivating the one state; and in response to the request for reactivating the one state: generating a blockchain transaction for restoring the one state in the another cyclic trigger flow, and transmitting the generated blockchain transaction to one or more blockchain nodes to add to the blockchain; and restoring the local state mapped to the one state in the cyclic trigger flow.

In some embodiments, the current state is configurable by a subscriber of one or more sub-states to comprise the one or more sub-states; and the method further comprises: establishing an association between the subscriber and the one or more sub-states for transmitting notifications associated with the one or more sub-states to the subscriber.

In some embodiments, the one or more sub-states form a cyclic trigger flow; the current state is public to the one or more subscribers; and the one or more sub-states are private to the subscriber of the one or more sub-states.

In some embodiments, transmitting the notification message to the one or more subscribers subscribing to the one state comprises: placing a notification message into a message queue for one or more computing devices associated with the one or more subscribers to obtain the notification message.

According to some embodiments, a system for blockchain-based notification comprises one or more processors and one or more computer-readable memories coupled to the one or more processors and having instructions stored thereon that are executable by the one or more processors to perform the method of any of the preceding embodiments.

According to some embodiments, an apparatus for blockchain-based notification comprises a plurality of modules for performing the method of any of the preceding embodiments.

According to some embodiments, a non-transitory computer-readable medium has stored therein instructions that, when executed by a processor of a device, cause the device to perform the method of any of the preceding embodiments.

According to other embodiments, a system for blockchain-based notification comprises one or more processors and one or more non-transitory computer-readable memories coupled to the one or more processors and configured with instructions executable by the one or more processors to cause the system to perform operations comprising: obtaining information in a block of a blockchain to determine a current state of a workflow, wherein a blockchain contract deployed in the blockchain is executable to update the current state among one or more states of the workflow; updating a locally-maintained state machine based on the determined current state; and in response to determining that the updated state machine corresponds to one of the one or more states, transmitting a notification message to one or more subscribers subscribing to the one state.

According to yet other embodiments, a non-transitory computer-readable storage medium for blockchain-based notification is configured with instructions executable by one or more processors to cause the one or more processors to perform operations comprising: obtaining information in a block of a blockchain to determine a current state of a workflow, wherein a blockchain contract deployed in the blockchain is executable to update the current state among one or more states of the workflow; updating a locally-maintained state machine based on the determined current state; and in response to determining that the updated state machine corresponds to one of the one or more states, transmitting a notification message to one or more subscribers subscribing to the one state.

According to still other embodiments, an apparatus for blockchain-based notification may comprise: an obtaining module for obtaining information in a block of a blockchain to determine a current state of a workflow, wherein a blockchain contract deployed in the blockchain is executable to update the current state among one or more states of the workflow; an update module for updating a locally-maintained state machine based on the determined current state; and a transmitting module for, in response to determining that the updated state machine corresponds to one of the one or more states, transmitting a notification message to one or more subscribers subscribing to the one state.

Embodiments disclosed in the specification have one or more technical effects. In some embodiments, convenient blockchain-based message subscription and notification may be provided and managed by a service provider. In one embodiment, a blockchain contract comprising one or more states of a workflow is deployed in a blockchain and is executable to update a current state among the one or more states, and the service provider may record subscribers subscribing to any of the states and maintain a local state machine mapped to the current state. The service provider may thus keep up-to-date to the progress in the workflow to notify subscribers. In some embodiments, by subscribing to the states of the workflow, the participants of the workflow no longer have to constantly obtain information from blocks of the blockchain to determine the progress. In one embodiment, the participants can automatically obtain notifications through a message queue with respect to their relevant states that they have subscribed, without having to filter information of irrelevant states. In one embodiment, based on the notification, corresponding execution steps for the relevant states may be automatically triggered and performed. In some embodiments, the computing power is conserved, and the workflow efficiency is enhanced. In some embodiments, workflow information is effectively collected from participants, organized by the system, and distributed to corresponding participants. In some embodiments, the participants can intuitively enable notification through subscription to one or more states of a workflow and timely receive notification messages when the one or more states become current. In some embodiments, participants are also provided with customization in terms of choice of state for subscription and choice of sub-states for creation and subscription. In one embodiment, the subscribers to the sub-states are provided with privacy protection as the sub-states are kept private.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 4D illustrates a flowchart of a method for blockchain-based notification in accordance with some embodiments.

FIG. 5 illustrates a flowchart of a method for blockchain-based notification in accordance with some embodiments.

DETAILED DESCRIPTION

In some embodiments, blockchain may be used to store the purchase-delivery status for online shopping and facilitate status information sharing among various participants. For example, an online purchase may involve a series of stages such as: order placement, item retrieval from storage, item delivery from storage to recipient, and recipient acknowledgement. The sale, storage, and delivery may be managed by different participants that each depend on a "finished" status of a previous stage to commence its own stage. For example, the storage needs to know that a placed order has been accepted by the seller, in order to start its stage of item retrieval, and the delivery company needs to know that the item has been retrieved from the storage to start its stage of loading, shipment, and delivery. Some stages may each comprise granular sub-stages. For example, the item delivery from storage to recipient stage may comprise sub-stages such as item reception by courier, item delivery to local facility, etc. And the delivery company may want to know the progress within the sub-stages.

In some blockchain schemes, in order to determine whether to commence its own stage, the participants of the online shopping event such as the seller, storage, and delivery company have to continuously obtain information from blocks of the blockchain to check if the previous stage or sub-stage is finished. As a result, each participant of the online shopping event has to frequently explore blocks of the blockchain for updates of the purchase-delivery statuses. Many explored information may not even be relevant to the inquiring participant. Thus, significant computing power is wasted in such process, and the overall efficiency of the workflow is low. The disclosed systems and methods may improve workflow management such as in the purchase-delivery process.

Figure 1:
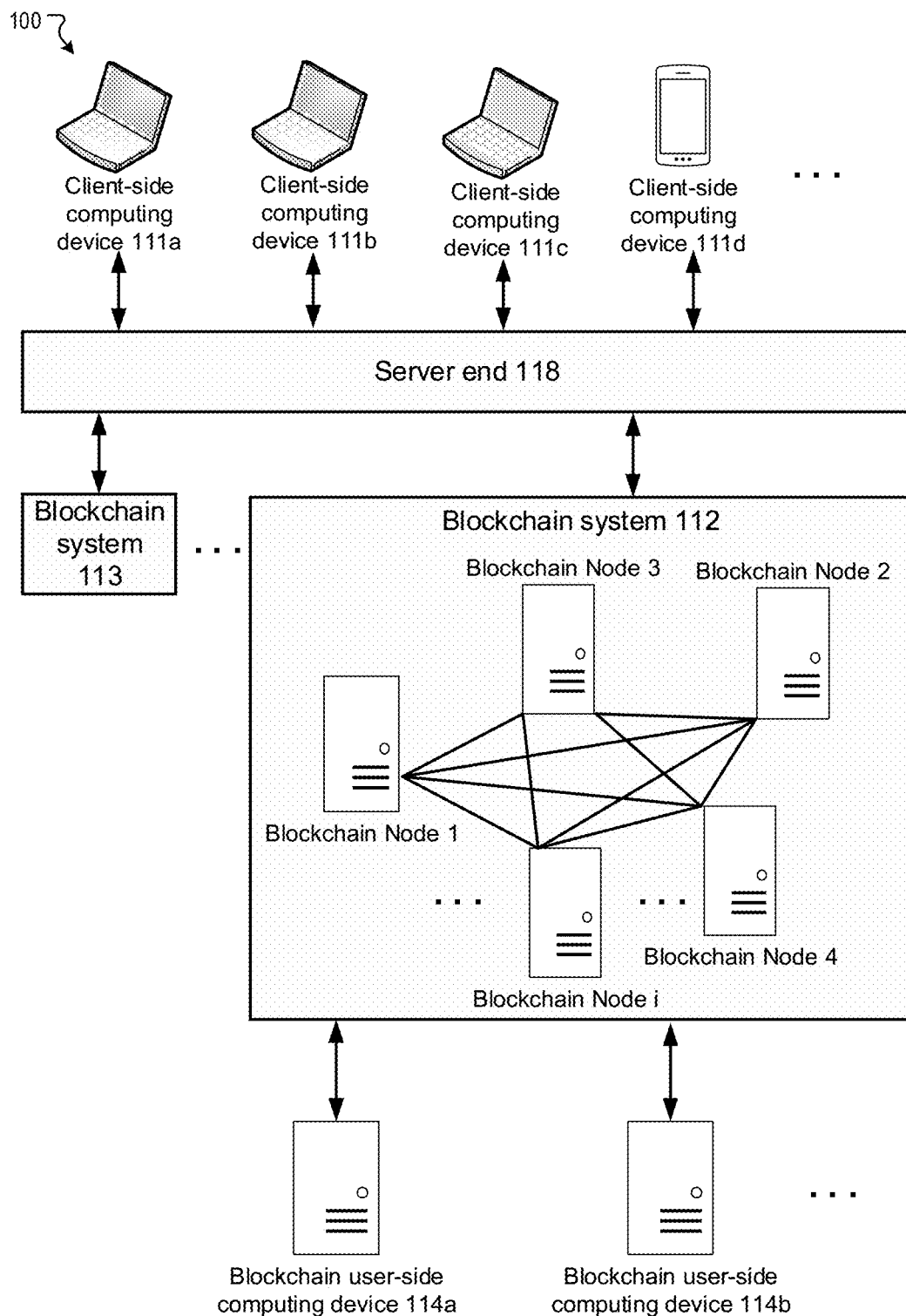
FIG. 1 illustrates an environment for blockchain-based notification in accordance with some embodiments.

FIG. 1 illustrates an environment 100 for registering subscribable states in blockchain in accordance with some embodiments. As shown, in the environment 100, one or more client-side computing devices (e.g., 111a, 111b, 111c, 111d) may couple to a server end 118 through various communication networks. The server end 118 may couple to one or more blockchain systems (e.g., 112, 113) through various communication networks. Each blockchain system may maintain one or more blockchains. Each blockchain may correspond to a unique blockchain ID. Additional computing devices may couple to each of the one or more blockchain systems. For example, blockchain user-side computing device (e.g., 114a, 114b) may couple to the blockchain system 112 through various communication networks.

In some embodiments, the client-side computing device (e.g., computer, server, mobile phone, etc.) is not limited to a single device and may comprise one or more computing devices in a cluster. The client-side computing device may be installed with a specialized software such as message queue (MQ) service software for communicating with the server end 118. The software may be embodied in a software application, a software terminal, a website, etc. The client-side computing device may be implemented by an entity (e.g., organization, company, enterprise, individual person). The entity may be a participant of a workflow. For example, the entity may be involved in a part of the workflow and thus becomes a participant. As described herein, the participant may subscribe to a state of the workflow corresponding to the part of the workflow to receive notification.

In some embodiments, the blockchain system 112 may comprise a plurality of blockchain nodes (e.g., Blockchain Node 1, Blockchain Node 2, Blockchain Node 3, Blockchain Node 4, Blockchain Node i, etc.) that maintain one or more blockchains (e.g., public blockchain, private blockchain, consortium blockchain, etc.). Other blockchain systems (e.g., blockchain system 113, etc.) may comprise a similar arrangement of blockchain nodes maintaining another blockchain. Each blockchain node may be found in one or more blockchain systems. The blockchain nodes may include full nodes. Full nodes may download every block and blockchain transaction and check them against the blockchain's consensus rules. The blockchain nodes may form a network with one blockchain node communicating with another. The order and the number of the blockchain nodes as shown are merely examples for illustration. The blockchain nodes may be implemented in servers, computers, etc. For example, each blockchain node may be implemented in a server or a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

In some embodiments, the blockchain user-side computing device may include a lightweight node. A lightweight node may not download the complete blockchain, but may instead just download the block headers to validate the authenticity of the blockchain transactions. Lightweight nodes may be served by and effectively depend on full nodes (e.g., blockchain nodes in the blockchain system 112) to access more functions of the blockchain. The lightweight nodes may be implemented in electronic devices such as laptops, mobile phones, and the like by installing an appropriate software. In one embodiment, the blockchain user-side computing device may send a blockchain transaction to the blockchain system 112 for adding to the blockchain.

In some embodiments, the server end 118 may provide Blockchain-as-a-Service (BaaS) and be referred to as a BaaS end. In one embodiment, BaaS is a cloud service model in which clients or developers outsource behind-the-scenes aspects of a web or mobile application. BaaS may provide pre-written software for activities that take place on blockchains, such as subscription and notification, user authentication, database management, and remote updating. The BaaS end may be implemented in a server, server cluster, or other devices. In one embodiment, the BaaS end provides an enterprise-level platform service based on blockchain technologies. This service helps clients to build a secure and stable blockchain environment as well as manage the deployment, operation, maintenance, and development of blockchain easily. The service features high security, high stability, ease-of-use, and openness and sharing. Based on the abundant security strategies and multi-tenant isolation of cloud, the BaaS end can provide advanced security protection using chip encryption technologies. Based on highly reliable data storage, this service provides end-to-end and highly available services that can scale up quickly without interruption. The BaaS end can provide enhanced administrative functions to help clients to build an enterprise-level blockchain network environment. The BaaS end can provide native support for standard blockchain applications and data, support mainstream open-source blockchain technologies like Hyperledger Fabric and Enterprise Ethereum-Quorum, to build an open and inclusive technology ecosystem.

In the environment 100, each of the systems, nodes, and devices may be installed with appropriate software (e.g., application program interface) and/or hardware (e.g., wires, wireless connections) to access other devices of the environment 100. In general, the systems, nodes, and devices may be able to communicate with one another through one or more wired or wireless networks (e.g., the Internet) through which data can be communicated. Each of the systems, nodes, and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the systems, nodes, and devices are shown as separate components in this figure, it will be appreciated that these systems, nodes, and devices can be implemented as single devices or multiple devices coupled together.

The server end 118 and the blockchain user-side computing devices may be installed with an appropriate blockchain software for initiating, forwarding, or accessing blockchain transactions. The term "blockchain transaction" may refer to a unit of task executed in a blockchain system and recorded in the blockchain upon verification. In some embodiments, the server end 118 may construct a blockchain contract based on information obtained from the one or more client-side computing devices. The server end 118 may add the blockchain contract in a blockchain transaction. After the server end 118 submits the blockchain transaction to the blockchain system, the blockchain nodes may verify the blockchain transaction for adding to the blockchain. If the blockchain transaction is added to the blockchain, the blockchain contract is deployed in the blockchain. In some embodiments, the deployed blockchain contract may comprise a workflow which has one or more states. The state that the workflow is currently in may be referred to as a current state. Through one or more additional blockchain transactions, the deployed blockchain contract may be invoked to update the current state.

Blockchain transactions may be verified according to a consensus rule. For example, a POW (proof-of-work) consensus process is provided below. Notwithstanding, other types of consensus process such as POS (proof-of-stake), DPOS (delegate-proof-of-stake), and PBFT (practical Byzantine Fault Tolerance) may be similarly applied to the disclosed systems and methods.

In some embodiments with respect to blockchain transaction verification, after receiving a blockchain transaction request of an unconfirmed blockchain transaction, a recipient blockchain node may perform some preliminary verification of the blockchain transaction. For example, Blockchain Node 1 may perform the preliminary verification after receiving a blockchain transaction from the server end 118. Once verified, the blockchain transaction may be stored in the database of the recipient blockchain node (e.g., Blockchain Node 1), which may also forward the blockchain transaction to one or more other blockchain nodes (e.g., Blockchain Node 2, Blockchain Node 3, Blockchain Node 4). Similarly, the each blockchain node may comprise or couple to a memory storing a database. The database may store a plurality of unconfirmed blockchain transactions. After receiving the blockchain transaction, the one or more other blockchain nodes may repeat the preliminary verification and broadcasting process done by the recipient blockchain node.

For verification, each blockchain node may select some of the blockchain transactions from the database according to its preference and form them into a proposed new block for the blockchain. The blockchain node may perform "mining" of the proposed new block by devoting computing power to solve complex mathematical problems. If the blockchain transaction involves a blockchain contract, the blockchain nodes may execute the blockchain contract locally in respective virtual machines (VMs). To handle the blockchain contracts, each blockchain node of the blockchain network runs a corresponding VM and executes the same instructions in the blockchain contract. A VM is a software emulation of a computer system based on computer architectures and provides functionality of a physical computer. VM in the blockchain context can be understood as a system designed to operate as a runtime environment for blockchain contracts.

A certain blockchain node that successfully mines the proposed new block of blockchain transactions in accordance with consensus rules may pack the new block into its local copy of the blockchain and multicast the results to other blockchain nodes. The certain blockchain node may be a blockchain node that has first successfully completed the verification, that has obtained a verification privilege, that has been chosen based on another consensus rule, etc. Then, the other blockchain nodes may follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories. As such, the blockchain contract can be deployed in the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, a deployed blockchain contract may be invoked to add or update certain information in the blockchain contract, thereby updating one or more states in the blockchain contract. In one embodiment, the one or more states of the blockchain contract may be retrieved from the blockchain by inquiring a corresponding blockchain transaction added to the blockchain. The most updated state may be reflected in the most recent relevant blockchain transaction. Notwithstanding the above, other types of blockchain systems and associated consensus rules may be applied to the disclosed devices and methods.

Figure 2:
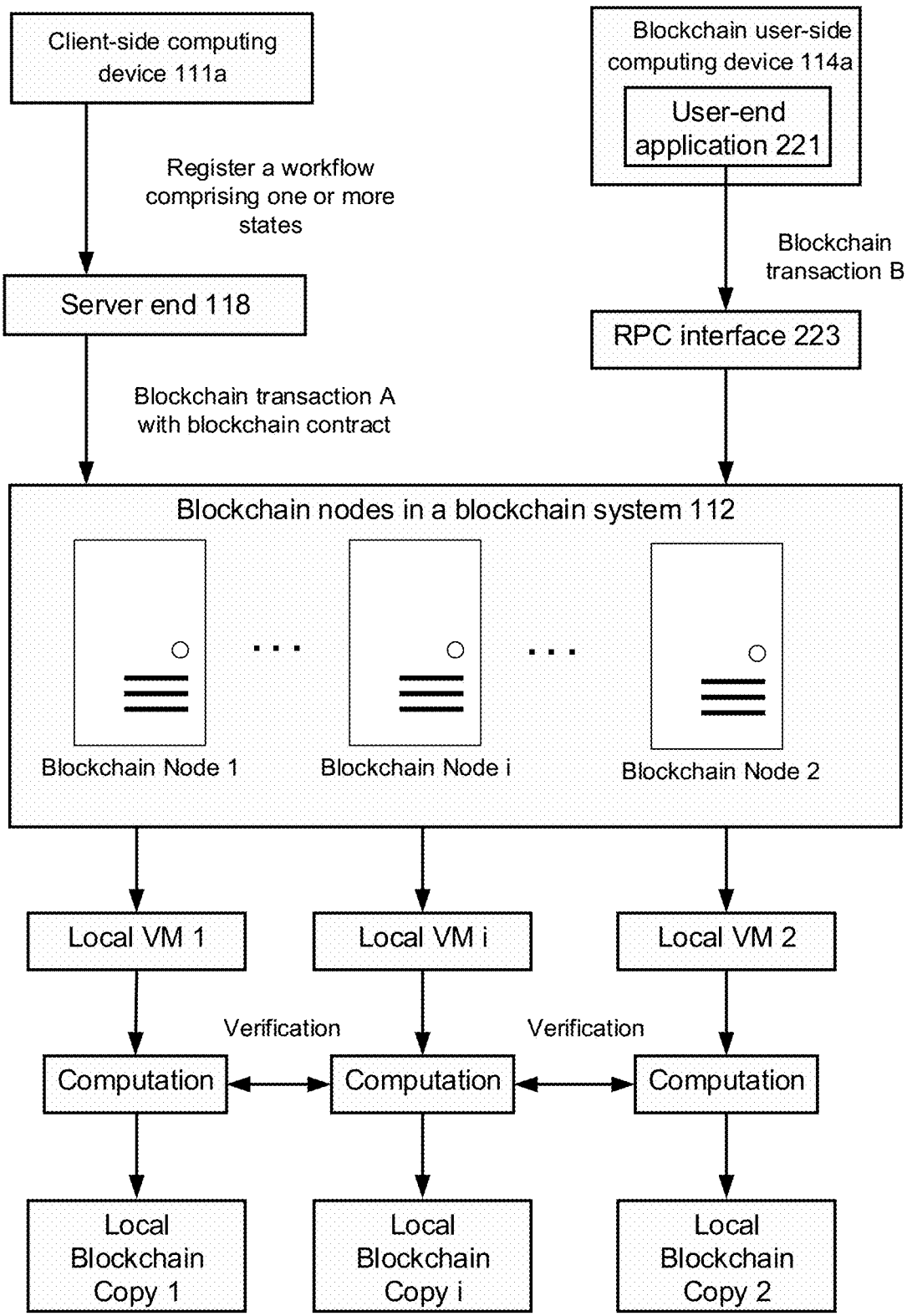
FIG. 2 illustrates a framework for blockchain-based notification in accordance with some embodiments.

FIG. 2 illustrates a framework for implementing blockchain transactions in accordance with some embodiments. In some embodiments, the client-side computing device 111a may transmit information to the server end 118. In one embodiment, the information may comprise a request to register in a blockchain a workflow comprising one or more states. The blockchain may be maintained by the blockchain system 112. To perform the registration, the server end 118 may construct a blockchain contract based on the information obtained from the client-side computing device 111a. The server end 118 may add the blockchain contract in a blockchain transaction A. The server end 118 may sign the blockchain transaction on behalf of the user associated with the client-side computing device 111a. For example, the blockchain transaction A may comprise information such as nonce (e.g., transaction serial number), from (e.g., a blockchain address of the user), to (e.g., empty if deploying a blockchain contract), transaction fee, signature (e.g., signature of the server end 118, signature of the user managed by the server end 118), value (e.g., transaction amount), data (e.g., the blockchain contract), etc. Then, the server end 118 may submit the blockchain transaction A to one or more blockchain nodes of the blockchain system 112 for adding to the blockchain.

After the blockchain transaction is added to the blockchain, the blockchain contract is deployed in the blockchain. The workflow in the deployed blockchain contract may be in one of the one or more states. For example, the workflow may comprise states 1, 2, and 3 and may be initiated at state 1. Thus, the current state is state 1. Through one or more additional blockchain transactions, the deployed blockchain contract may be invoked to update the current state. For example, the deployed blockchain contract may be invoked to move forward the workflow from state 1 to state 2, thus changing the current state to state 2.

In some embodiments, a blockchain user-side computing device (e.g., blockchain user-side computing device 114a) may construct a signed blockchain transaction B and transmit it to the blockchain system 112 for execution. In one embodiment, the blockchain transaction B may be executed to invoke the deployed blockchain contract. The invocation may update the current state of the workflow. In some embodiments, the blockchain transaction B may be programmed in source code at a user-end application 221. For example, a user or machine may program the blockchain transaction B. The blockchain user-side computing device may compile the source code using a corresponding compiler, which converts the source code into bytecode. The blockchain transaction B may comprise information such as nonce, from, to, transaction fee, value, signature, data, etc. The blockchain user-side computing device 114a may send the blockchain transaction B to one or more blockchain nodes of the blockchain system 112 through a remote procedure call (RPC) interface 223 for execution. RPC is a protocol that a first program (e.g., user-end application) can use to request a service from a second program located in another computer on a network (e.g., blockchain node) without having to understand the network's details. When the first program causes a procedure to execute in a different address space, it is as if a normal (local) procedure call, without the programmer explicitly coding the details for the remote interaction.

In some embodiments, on receiving the blockchain transaction (e.g., blockchain transaction A or B), the recipient blockchain node may verify if the blockchain transaction is valid. For example, the signature and other formats may be verified. If the verification succeeds, the recipient blockchain node may broadcast the received blockchain transaction to the blockchain network including various other blockchain nodes. Some blockchain nodes may participate in the mining process of the blockchain transaction. The blockchain transaction may be chosen by a certain node for consensus verification to pack into a new block. If the blockchain transaction involves deploying a blockchain contract, the certain node may create a contract account for the blockchain contract in association with a contract account address. If the blockchain transaction involves invoking a deployed blockchain contract, the certain node may trigger its local VM to execute the received blockchain transaction, thereby invoking the deployed blockchain contract from its local copy of the blockchain and updating the states in the deployed blockchain contract.

If the certain node succeeds in mining a new block, the certain node may broadcast the new block to other blockchain nodes. Upon receiving the new block, the other blockchain nodes may perform verifications. If a consensus is reached that the new block is valid, the new block is respectively packed to the local copies of the blockchain maintained by the blockchain nodes. The blockchain nodes may similarly trigger their local VMs (e.g., local VM 1, local VM i, local VM 2) to execute the blockchain transactions in the new block, thus invoking local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain transaction. Likewise, all other blockchain transactions in the new block will be executed. Lightweight nodes may also synchronize to the updated blockchain.

Figure 3A:
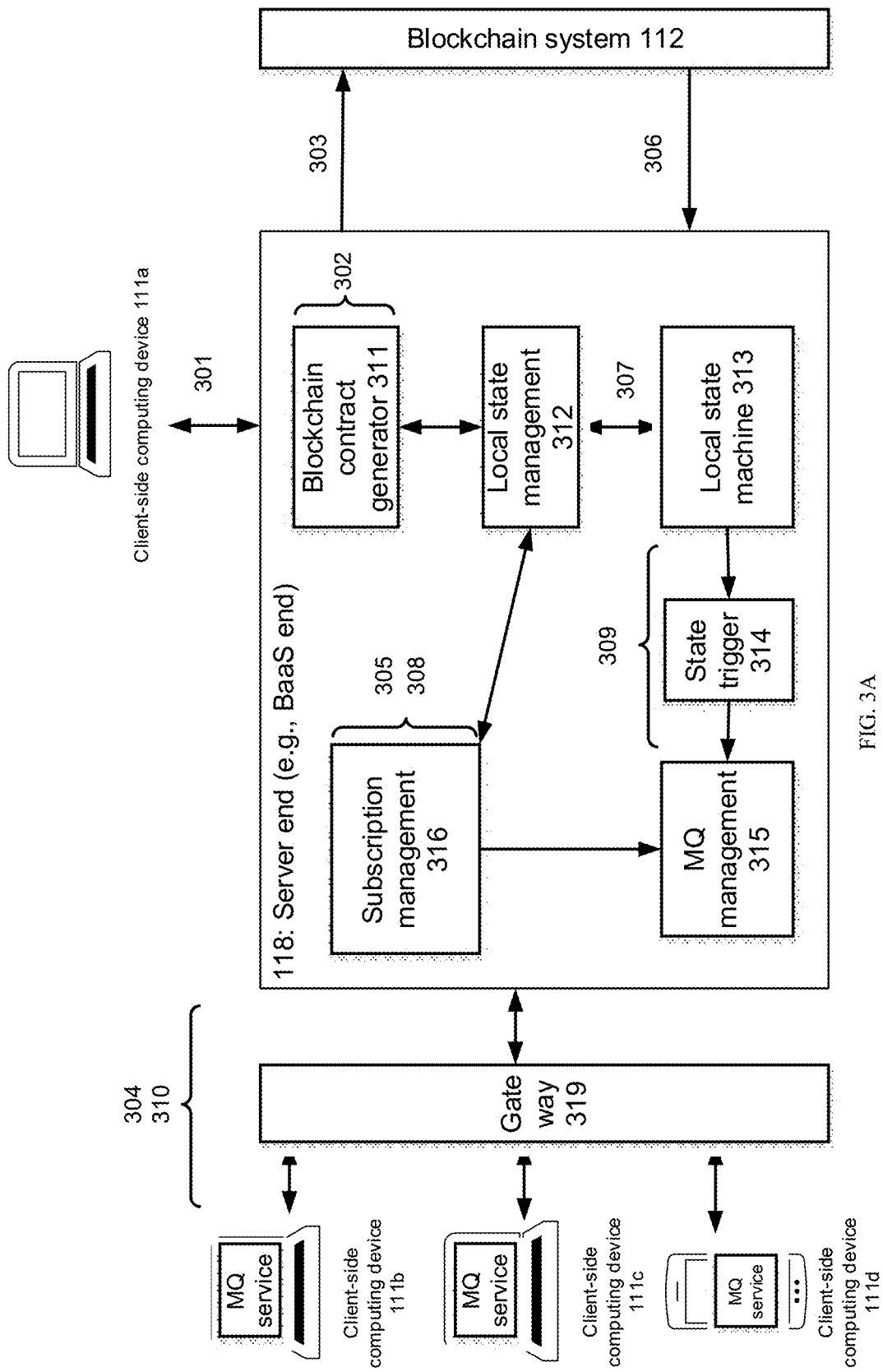
FIG. 3A illustrates an interaction diagram for blockchain-based notification in accordance with some embodiments.
Figure 3B:
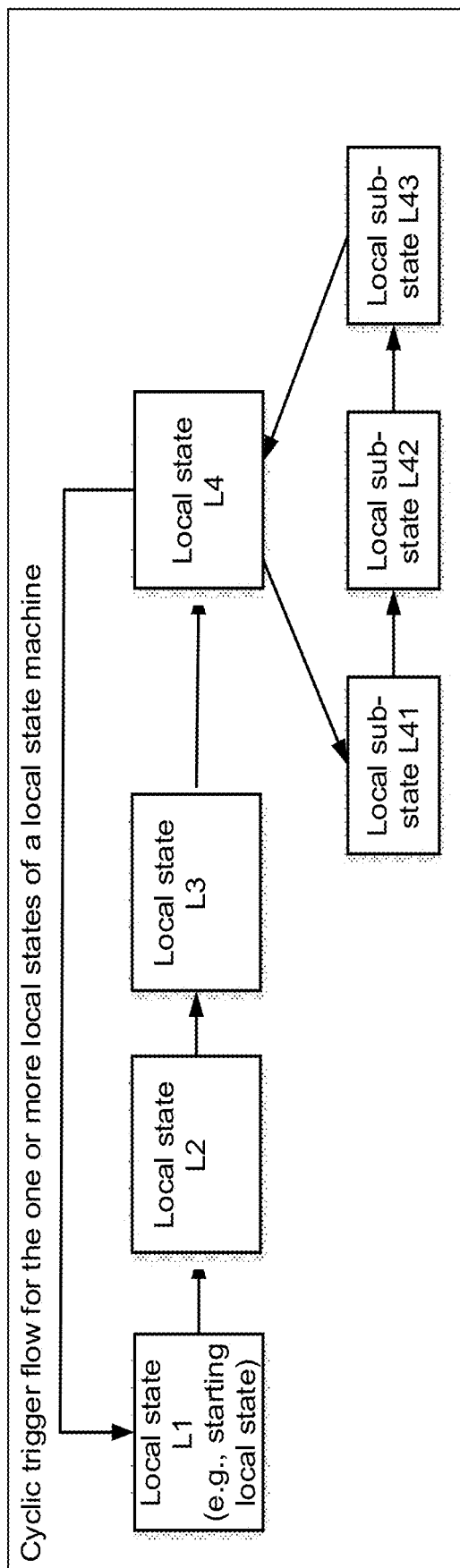
FIG. 3B illustrates a cyclic trigger flow for one or more local states of local state machine in accordance with some embodiments.
Figure 3C:
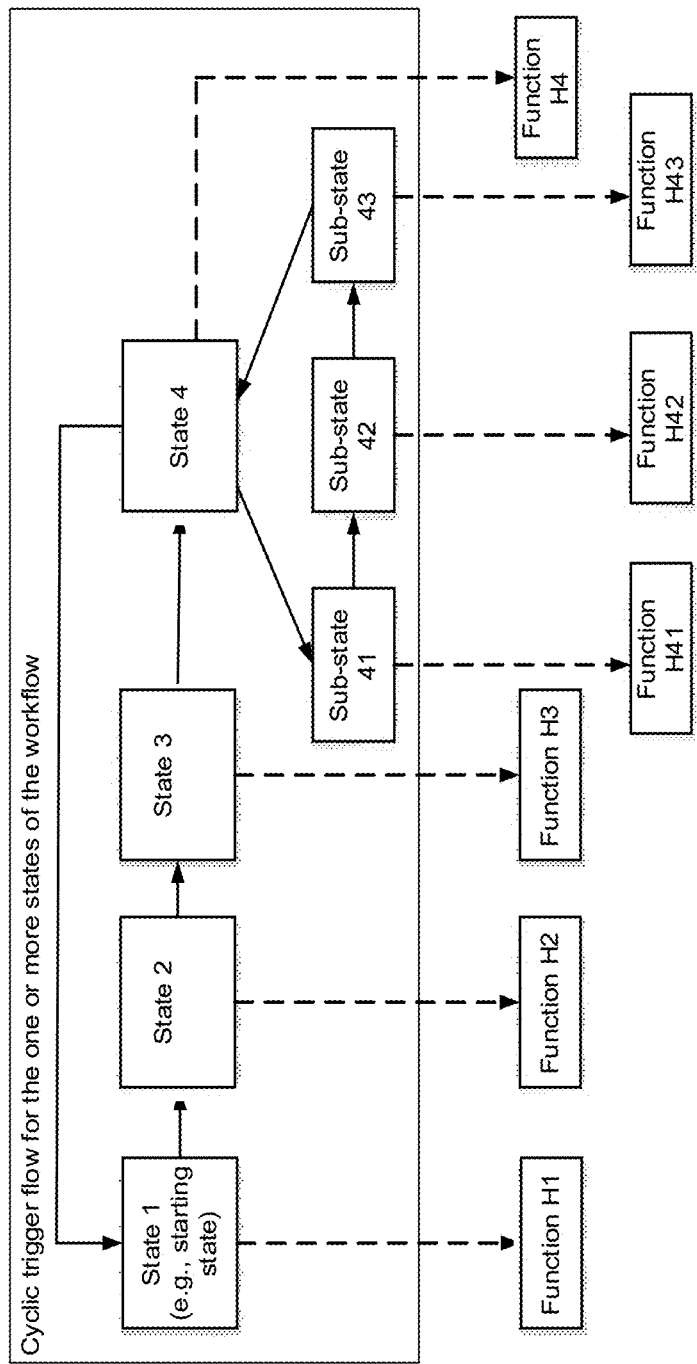
FIG. 3C illustrates a cyclic trigger flow for one or more states of a workflow and corresponding functions for blockchain-based notification in accordance with some embodiments.

FIG. 3A illustrates an interaction diagram for registering subscribable states in blockchain in accordance with some embodiments. FIG. 3B illustrates a cyclic trigger flow for one or more local states of local state machine in accordance with some embodiments. FIG. 3C illustrates a cyclic trigger flow for one or more states of a workflow and corresponding functions for registering subscribable states in blockchain in accordance with some embodiments. The operations of the method presented below are intended to be illustrative. Depending on the implementation, the steps below may include additional, fewer, or alternative steps performed in various orders or in parallel. The order of the steps is also illustrative, as some of the orders may be switched or processed in parallel.

Referring to FIG. 3A, in some embodiments, the blockchain system 112 may comprise a plurality of blockchain nodes that maintain one or more blockchains (e.g., public blockchain, private blockchain, consortium blockchain, etc.). Although the following description may use consortium blockchain as an example, other types of blockchains may similarly apply in the embodiments described herein.

In one embodiment, consortium blockchain refers to a blockchain with consensus procedures controlled by preset nodes. The blockchain may allow everyone or only approved participants to access or adopt a hybrid access method. For example, the root hash and its API (Application Program Interface) may be open to the public, and external parties are allowed to use API to make a certain number of inquiries and obtain information relating to blockchain status.

In one embodiment, consortium blockchains can best be understood when compared to their more popular counterpart, public blockchains. A public blockchain possesses no access restriction, meaning that absolutely anyone with an internet connection can become a participant of a public blockchain. For example, anyone in the world is able to read data that is included on the blockchain, and anyone in the world is allowed to execute transactions on a public blockchain. Also, there is no restriction as to who can participate in the consensus process for blockchains, which is the process that determines the individual or entity that can add a block to the blockchain. Public blockchains are considered to be fully decentralized, with control over the blockchain not being in the hands of any single individual or entity.

In one embodiment, consortium blockchains differ from their public counterparts in that they are permissioned, thus, not just anyone with an internet connection could gain access to a consortium blockchain. These types of blockchains could also be described as being semi-decentralized. Control over a consortium blockchain is not granted to a single entity, but rather a group of approved individuals. With a consortium blockchain, the consensus process is likely to differ from that of a public blockchain. Instead of anyone being able to partake in the procedure, consensus participants of a consortium blockchain are likely to be a group of pre-approved nodes on the network. The nodes may correspond to various countries, enterprises, or other entities. Thus, consortium blockchains possess the security features that are inherent in public blockchains, whilst also allowing for a greater degree of control over the network.

In some embodiments, various participants to a workflow may access the server end 118 or one or more similar computing devices to obtain blockchain-stored information of the workflow. The workflow may comprise a progressing event, an evolving circumstance, etc. The workflow may comprise a series of stages for which triggering one stage depends on a preceding stage. In one embodiment, of the one or more stages of the workflow, each state may switch or progress from and to one another state. For example, the workflow may comprise an online purchase event comprising stages from order placement, to item retrieval from storage, then to item delivery from storage to recipient, and then to recipient acknowledgement. For example, the storage needs to know that the order has been placed to start its stage of item retrieval, and the delivery company needs to know that the item has been retrieved from the storage to start its stage of loading, shipment, and delivery. Similarly, other types of workflow such as calendar event, work schedule, production schedule, event schedule, and the like may be similarly applicable.

In some embodiments, the various participants may collaboratively participate in the workflow. In one example, for the online purchase-delivery event, participants to the workflow may comprise an administrator of the workflow, an online platform, a seller, a storage company, and a delivery company. Each participant may be involved in one or more stages of the workflow. The order placement stage may be managed by the seller; the item retrieval stage may be managed by the storage company; the item delivery and recipient acknowledgement stage may be managed by the delivery company. The above stages may be configured by the administrator, which may be elected by the seller, the storage company, and the delivery company, or otherwise elected or designated. In one embodiment, the various participants to the workflow may be parties to a consortium blockchain. For example, each participant may be associated with a consortium blockchain address, which may be used for identification, obtaining information, sending information, etc.

In some embodiments, each participant to the workflow may be represented by one or more computing devices, and corresponding steps (e.g., sending or receiving information, displaying information) may be automatically performed by the one or more computing devices. For example, the administrator may be represented by the client-side computing device 111a, the seller may be represented by the client-side computing device 111b, the storage may be represented by the client-side computing device 111c, and the delivery company may be represented by the client-side computing device 111d. The client-side computing devices may be installed with a software such as MQ service to access the server end 118. These representations are merely examples, and the various computing devices may have additional or alternative associations.

In some embodiments, at step 301, from the client-side computing device 111a, the server end 118 may obtain a request for registering a workflow comprising one or more states. In some embodiments, obtaining the request for registering the one or more states corresponding to the workflow may comprise obtaining from an administrator of the workflow the request for registering the one or more states corresponding to the workflow. The administrator may refer to a computing device associated with authorization to add, ban, or revive the one or more states as a state group. The administrator may also have authorization to add, ban, or revive individual states. The blockchain may comprise a consortium blockchain.

In some embodiments, the server end 118 may include various components implemented as software and/or hardware. The components may include but are not limited to, for example, a blockchain transaction generator 311, a local state management module 312, a local state machine 313, a state trigger 314, an MQ management module 315, and a subscription management module 316. The various components may be collectively or individually implemented as one or more processors and one or more non-transitory computer-readable storage media having stored therein instructions that, when executed by the one or more processors, cause the server end 118 to perform the disclosed steps. These components and their arrangements are merely examples, and there can be fewer, additional, or alternative components and alternative arrangements.

In one embodiment, after receiving the information of step 301, at step 302, the server end 118 (e.g., the blockchain contract generator 311) may generate a blockchain contract comprising the workflow. For example, the blockchain contract may define the workflow, the one or more states, and relations among the states. The blockchain contract may further define that the workflow may be in one of the states at one time. The one or more states may comprise a starting state, an ending state, and other states between the starting and the ending states with a logic association. For example, the one or more states may be configured in a cyclic trigger flow registered in the blockchain. The cyclic trigger flow may start with the starting state of the one or more states, passes through each of the one or more states once in one direction till the ending state, and returns to the starting state. Each of the one or more states may be triggered by completion of a preceding state in the cyclic trigger flow.

In some embodiments, at step 303 the server end 118 may deploy the blockchain contract in a blockchain. For example, the server end 118 may generate a blockchain transaction comprising the generated blockchain contract, and transmit the blockchain transaction to one or more blockchain nodes of the blockchain system 112 for adding the blockchain transaction to the blockchain. As described above, by blockchain node verification, the blockchain contract may be added to a block of the blockchain and thus be deployed in the blockchain.

In some embodiments, the server end 118 may execute the blockchain contract to initiate a current state to be a starting state of the one or more states. For example, the workflow's one or more states may comprise a starting state. The execution may be programmed in the generated blockchain transaction, so that during or after the blockchain contract deployment, the workflow's current state is initiated as the starting state.

In some embodiments, the deployed blockchain contract is executable to update a current state of the workflow among the one or more states. For example, various computing devices may transmit blockchain transactions to add to the blockchain, and such blockchain transactions may invoked the deployed blockchain contract to move forward the workflow from the starting state to the next state and so forth, thus changing the current state. If a consensus-verified blockchain transaction is added to a new block of the blockchain, all blockchain nodes may execute the blockchain contract based on the consensus-verified blockchain transaction to update the current state of the workflow. Through the execution, the local copies of the blockchain may be respectively updated for the current state.

In one embodiment, for the online purchase-delivery event, each purchase-delivery process may correspond to one round of the workflow. For example, the seller may sell an item from an online platform. The workflow's current state in the blockchain contract may be initiated to be the starting state: (state 1) waiting for order. When an order is placed in the seller's virtual store on the online platform, the online platform may transmit a blockchain transaction to the blockchain (e.g., with the online platform's signature), whether through the server end 118 or not, which moves forward the workflow to: (state 2) order received. If the seller has subscribed to state 2, the seller will be able to obtain a notification for the received order. If the seller accepts the order and updates the blockchain (e.g., by transmitting a blockchain transaction signed by the seller to the blockchain), the workflow may move forward to: (state 3) item retrieval from storage. If the storage has subscribed to state 3, the storage will be able to obtain a notification for retrieving the order item. If the storage retrieves the item and updates the blockchain (e.g., by transmitting a blockchain transaction signed by the storage to the blockchain), the workflow may move forward to: (state 4) item delivery. If the delivery company has subscribed to state 4, the delivery company will be able to obtain a notification for delivering the order item. If the delivery company finishes the item delivery and updates the blockchain (e.g., by transmitting a blockchain transaction signed by the delivery company or the recipient to the blockchain), the workflow may move back to: (state 1) waiting for order. One round of the workflow may thereby be completed.

In some embodiments, at step 304, the server end 118 may obtain from a subscriber a request for subscribing to notification of one of the one or more states. Similarly, the server end 118 may obtain from a subscriber one or more requests for subscribing to notification(s) of one or more of the one or more states, or obtain from multiple subscribers one or more requests for subscribing to notification of one of the one or more states. That is, a subscriber can subscribe to one or more states among one or more state groups, and one or more subscribers can subscribe to one state. In one embodiment, for the online purchase-delivery event, to confirm the order, the seller may subscribe to (state 2): order received; to start retrieving the item, the storage may subscribe to (state 3): item retrieval from storage; and to commence delivery, the delivery may subscribe to (state 4): item delivery. The subscription requests may need to be approved by the administrator of the workflow.

Optionally, the server end 118 may obtain the one or more requests through a gateway 319. A gateway may be a piece of networking hardware used in telecommunications for telecommunications networks that allows data to flow from one discrete network to another. The gateway 319 may provide load balancing to improve communication between the various client-side computing devices and the server end 118.

Further, at step 305, the server end 118 may establish an association between the subscriber and the one state. For example, the subscription management module 316 may establish and store the association. If the subscriber later cancels the subscription, the server end 118 may correspondingly remove the association.

In some embodiments, at step 306, the server end 118 may obtain information in one or more blocks of the blockchain to determine the current state. In some embodiments, as the starting state is initiated as the current state, blockchain transactions further added to the blockchain may invoke the blockchain contract and move forward the workflow, thus changing the current state of the workflow. In some embodiments, the server end 118 may obtain a blockchain transaction in one or more blocks of the blockchain, wherein the blockchain transaction triggers execution of the blockchain contract to update the current state of the workflow. The server end 118 may further determine the current state of the workflow according to the obtained blockchain transaction.

In some embodiments, at step 307, the server end 118 (e.g., local state management module 312) may update a locally-maintained state machine (e.g., local state machine 313) based on the determined current state of the workflow. In one embodiment, the server end 118 may maintain the state machine. State machine may also be referred to finite-state machine. A state machine may be an abstract machine (e.g., computation model) that can be in exactly one of a finite number of states at any given time.

Referring to FIG. 3B and FIG. 3C, in some embodiments, the locally-maintained state machine may comprise one or more local states (e.g., local state L1, local state L2, local state L3, local state L4) respectively mapped to the one or more states (e.g., state 1, state 2, state 3, state 4) of the workflow registered in the blockchain. As shown in FIG. 3B, the one or more local states are configured in a cyclic trigger flow maintained locally. The cyclic trigger flow starts with a starting local state of the one or more local states, passes through each of the one or more local states once in one direction till an ending local state, and returns to the starting local state. In one example, for the online purchase-delivery event, local state L1 is mapped to (state 1) waiting for order, local state L2 is mapped to (state 2) order received, local state L3 is mapped to (state 3) item retrieval from storage, and local state L4 is mapped to (state 4) item delivery. Since state 1 is the starting state and the starting local state is mapped to the starting state, local state L1 is the local starting state. Similarly, local state L2 is mapped to state 2, local state L3 is mapped to state 3, etc. As shown in FIG. 3C, the one or more states registered in the blockchain are configured in another cyclic trigger flow registered in the blockchain. The another cyclic trigger flow registered in the blockchain starts with a starting state of the one or more states, passes through each of the one or more states once in one direction till an ending state, and returns to the starting state. The starting local state is mapped to the starting state. Each of the one or more states is triggered by completion of a preceding state in the another cyclic trigger flow registered in the blockchain. Since the local states are correspondingly mapped to the states of the workflow in the blockchain, each of the one or more local states may be effectively triggered by completion of a preceding local state in the cyclic trigger flow maintained locally.

By updating the locally-maintained state machine based on the determined current state of the workflow, the local state machine's state reflects the current state of the workflow in the blockchain in a synchronized manner. For example, if the workflow in the blockchain is in state 2, the local state machine may stay in local state L2; if the workflow then progresses to state 3, the local state machine may switch to local state L3.

In some embodiments, each of the one or more states is configurable by a subscriber to one or more sub-states to comprise the one or more sub-states. For example, based on the blockchain contract or its further modifications, the workflow may be in a certain granular state under one of the one or more states, which may be referred to a sub-state of the one state. In some embodiments, the server end 118 may obtain a request for registering one or more sub-states of a state, wherein a registered workflow comprises the state. The request may be obtained from a creator-subscriber of the one or more sub-states. The configuration may need to be approved by the administrator of the workflow. The server end 118 may obtain the one state that is comprised in a deployed blockchain contract and of which the one or more sub-states are to be configured, obtain information from the blockchain to determine if the state is configurable to comprise the one or more sub-states, and in response to determining that the state is configurable to comprise the one or more sub-states, generate the blockchain contract comprising the one or more sub-states. For example, certain states may have been configured in their deployed blockchain contract such that it is permissive to add sub-states under them, while other states may not. In some embodiments, the generated blockchain contract is configured to invoke the deployed blockchain contract to update the one state to comprise the one or more sub-states. Therefore, based on the deployed blockchain contract providing a big framework of the workflow, individual participants may add more granular steps of the workflow for customization and precision. The server end 118 may deploy the generated blockchain contract in the blockchain, wherein the deployed blockchain contract is executable to update a current sub-state of the state corresponding to the workflow among the one or more sub-states. The generation and deployment steps for registering sub-states are similar to those described above with reference to registering states.

In one example, as shown in FIG. 3C, for the online purchase-delivery event, the delivery company may configure additional sub-states (e.g., sub-state 41, sub-state 42, sub-state 43) under state 4 initially configured by the administrator, through the server end 118. Correspondingly, as shown in FIG. 3B, the client-side computing device 111d may configure one or more local sub-states respectively mapped to the one or more sub-states, through the server end 118.

In some embodiments, the server end 118 may obtain information in one or more blocks of the blockchain to determine the current sub-state. Further, the server end 118 may update a locally-maintained state machine based on the determined current sub-state. In one embodiment, the locally-maintained state machine comprises a local state mapped to the state of the workflow registered in the blockchain and comprises one or more local sub-states respectively mapped to the one or more sub-states registered in the blockchain. The one or more sub-states and the state registered in the blockchain may form a cyclic trigger flow registered in the blockchain. For example, as shown in FIG. 3C, sub-state 41, sub-state 42, sub-state 43, and state 4 form a cyclic trigger flow registered in the blockchain.

In some embodiments, the one or more local sub-states are configured in a cyclic trigger flow maintained locally; and the cyclic trigger flow maintained locally starts with the local state, passes through each of the one or more local sub-states once in one direction, and returns to the local state. For example, by mapping, as shown in FIG. 3B, local sub-state L41, local sub-state L42, and local sub-state L43, and local state L4 form a cyclic trigger flow maintained locally. The cyclic trigger flow involving sub-states may work similarly as the cyclic trigger flow with just states. Since the local sub-states are correspondingly mapped to the sub-states of the registered workflow in the blockchain, each of the one or more local sub-states may be effectively triggered by the local state or completion of a preceding local sub-state in the cyclic trigger flow maintained locally. For example, when state 4 becomes the workflow's current state, the workflow may not progress to the next state (state 1) until a configured logic involving the sub-states is completed. For instance, sub-states 41, 42, and 43 may be configured such that, when state 4 is the current state, sub-state 41 is triggered, the completion of which triggers sub-state 42, and so forth. Here, sub-state 41 may be a starting sub-state and sub-state 43 may be an ending sub-state. The workflow has to complete sub-states 41, 42, and 43 one by one in series for one or more times in order to progress to the next state (state 1). For the online purchase-delivery event, the delivery company may configure (sub-state 41) item received by courier, (sub-state 42) item delivered to local facility, and (sub-state 43) recipient signed-off receipt.

At step 308, the server end 118 (e.g., the subscription management module 316) may establish an association between the subscriber and the one or more sub-states for transmitting notifications associated with the one or more sub-states to the subscriber. The subscriber of the one or more sub-states may be the user that created the one or more sub-states. In one example, an association may be established between the client-side computing devices 111d representing the subscriber delivery company and the sub-states 41, 42, and 43. Through the association, the server end 118 may arrange notification of the sub-state that the workflow is at for the client-side computing devices 111d. If the subscriber later cancels the subscription, the server end 118 may correspondingly remove the association.

In some embodiments, the one or more states are public to all subscribers to the one or more states. For example, states 1, 2, 3, and 4 are known to the client-side computing devices 111b, 111c, and 111d, other participants of the workflow, and/or other users of the blockchain. The client-side computing devices 111b, 111c, and 111d may each subscribe to one or more of the states. In some embodiments, the one or more sub-states are private to the subscriber to the one or more sub-states. Since the subscriber configured the one or more sub-states, the one or more sub-states may be private to the subscriber. The subscriber can manage the one or more sub-states, such as further configuring their access authorization. In one example, the sub-states 41, 42, and 43 configured by the client-side computing device 111*d* may be private to the client-side computing device 111*d*, thus unknown to other participants of the workflow.

In some embodiments, at step 309, the server end 118 (e.g., state trigger 314) may determine that the updated state machine corresponds to the one state. Further, at step 310, in response to determining that the updated state machine corresponds to one of the one or more states, the server end 118 may transmit a notification message to the subscriber to the one state (or similarly, to one or more subscribers subscribing to the one state). In some embodiments, the notification message comprises a message indicating that the one state is current and/or a result returned from completion of a preceding state among the one or more states. For example, if the state 3 becomes current, the server end 118 may transmit a notification message to the client-side computing device 111*c* since the storage company has subscribed to state 3. The notification message may include a message indicating that state 3 is current and/or a result returned from completing state 2. In one example, for the online purchase-delivery event, the result returned from completing state 2 may include an identification of the item and a digital signature of the seller representing the seller's approval of the order.

In some embodiments, similarly, at step 310, the server end 118 may transmit a corresponding notification message to the subscriber to a sub-state. The notification message comprises a message indicating the determined current sub-state and a result returned from the state and/or from completion of a preceding sub-state among the one or more sub-states. The client-side computing device may obtain, from a computing device (e.g., the server end 118), the notification message indicating that a current state of a workflow is one of one or more states of the workflow. A blockchain contract deployed in the blockchain is executable to update the current state among the one or more states of the workflow.

In some embodiments, transmitting the notification message to the one or more subscribers subscribing to the one state may comprise placing a notification message into a message queue for one or more computing devices associated with the one or more subscribers to obtain the notification message. For example, MQ management module 315 may place the notification message with respect to a certain state in a message queue. And a client-side computing device associated with a subscriber to the certain state may connect to the message queue to obtain the notification message.

In some embodiments, the client-side computing device may connect to a message queue to which the computing device (e.g., the server end 118) placed the notification message, and obtain the notification message from the message queue. The client-side computing device may further execute a function associated with the one state in response to the notification message. In some embodiments, the function is configurable by a subscriber to the one state. For example, referring to FIG. 3C, each subscriber may configure a function for a state or sub-state that the subscriber subscribes to. For example, state 1 may correspond to function H1, state 2 may correspond to function H2, state 3 may correspond to function H3, state 4 may correspond to function H4, sub-state 41 may correspond to function H41, sub-state 42 may correspond to function H42, and sub-state 43 may correspond to function H43. Each state may correspond to no function, one function for one or more subscribers, or multiple functions for one or more subscribers. Each sub-state may correspond to no function or one or more functions for a subscriber.

In some embodiments, a function may include a named section of a program that performs a specific task. In one embodiment, a function may be a type of procedure or routine. A function may or may not return a value. For example, executing function H2 may trigger compilation of the received order in a predetermined format and automatically sign on behalf of the seller to approve the order once state 2 is current.

In some embodiments, in response to completion of the execution of the function, the client-side computing device may transmit, to the computing device (e.g., the server end 118), a reply message indicating completion of the execution of the function associated with the one state. In one embodiment, the client-side computing device may transmit to the computing device an update of the one state for the computing device to commence obtaining information from the blockchain to re-determine the current state. For example, the update may indicate completion of the one state. In one embodiment, the client-side computing device may transmit the reply message to the computing device for the computing device to (1) generate a blockchain transaction for updating the one state (e.g., state 2), and (2) transmit the blockchain transaction to one or more blockchain nodes to add to the blockchain, causing the current state of the workflow to update to a state (e.g., state 3) subsequent to the one state. Then, the computing device may commence obtaining information from the blockchain to re-determine the current state. If the blockchain transaction is successfully added to the blockchain, the obtained information (e.g., a new block of the blockchain) may include the blockchain transaction, which indicates an update of the workflow to the state subsequent to the one state as in the blockchain. By re-determining the current state, the computing device may find that the workflow has progressed to the state subsequent to the one state as in the blockchain.

The one or more states of the workflow may be referred to as a state group. In some embodiments, obtaining the request for registering the one or more states corresponding to the workflow may comprise obtaining a request for registering a state group comprising the one or more states corresponding to the workflow. In some embodiments, one or more valid state groups may exist and function simultaneously in one blockchain. Any two or more of the state groups may not share a state.

In some embodiments, the administrator of the workflow may have authorization to add, ban, or revive a state group at the server end 118. Non-administrator participants of the workflow may not have authorization to add, ban, or revive a state group at the server end 118. The authorizations may be administered by the server end 118. By banning or reviving the state group, notification of the states of the state group may be banned or revived. In some embodiments, the server end 118 may obtain a request for ceasing notification of the state group, and in response to the request for ceasing notification of the state group, cease notification of the state group to one or more subscribers subscribing to the state group. To this end, the server end 118 may cease updating the local states mapped to the states of the workflow, or cease placing notifications in the message queue. Further, the server end 118 may obtain a request for resuming notification of the state group, and in response to the request for resuming notification of the state group, resume notification of the state group to one or more subscribers subscribing to the state group. To this end, the server end 118 may resume updating the local states mapped to the states of the workflow or resume placing notifications in the message queue.

In some embodiments, the administrator of the workflow may have authorization to add, ban, revive, or subscribe to an individual state. By adding a state, a new state may be added to an existing state group. Non-administrator participants of the workflow may not have authorization to add, ban, or revive a state, but have authorization to subscribe to the state. Both the administrator and the non-administrator participants may have authorization to configure sub-states. The authorizations may be administered by the server end 118. By banning or reviving a state, notification of the state may be banned or revived. In some embodiments, if a state is banned or deactivated, sub-states associated with the state are associatively banned or deactivated. If a subscriber cancels subscription to a state, sub-states associated with the state and configured by the subscriber are associatively banned or deactivated.

In some embodiments, the server end 118 may obtain a request for deactivating one of the one or more states. In response to the request for deactivating the one state, the server end 118 may generate a blockchain transaction for shortcutting the one state from the another cyclic trigger flow registered in the blockchain, and transmit the generated blockchain transaction to one or more blockchain nodes to add to the blockchain; and may shortcut a local state mapped to the one state from the cyclic trigger flow maintained locally. For example, if notification of state 3 is banned, the server end 118 may generate a blockchain transaction to shortcut state 3 in the another cyclic trigger flow of the one or more states of the workflow as shown in FIG. 3C, and transmit the blockchain transaction to one or more blockchain nodes to add to the blockchain. Once the blockchain transaction is added to the blockchain, state 3 will be shortcut from the another cyclic trigger flow of the one or more states of the workflow in FIG. 3C. The server end 118 may further shortcut local state L3 in the cyclic trigger flow of the one or more local states as shown in FIG. 3B. Thus, the states of the blockchain contract will no longer include state 3, and states before and after state 3 will connect in the another trigger flow. Similarly, the local state machine will not keep the local state L3, and local states before and after local state L3 will connect in the trigger flow. As a result, notification of state 3 is effectively muted. Thus, the one state is configurable to be shortcut from the another cyclic trigger flow registered in the blockchain in response to deactivating notification of the one state, and a local state mapped to the one state is configurable to be shortcut from the cyclic trigger flow maintained locally in response to deactivating notification of the one state.

In some embodiments, the server end 118 may obtain a request for reactivating one of the one or more states. In response to the request for reactivating the one state, the server end 118 may generate a blockchain transaction for restoring the one state in the another cyclic trigger flow registered in the blockchain, and transmit the generated blockchain transaction to one or more blockchain nodes to add to the blockchain; and may restore the local state mapped to the one state in the cyclic trigger flow maintained locally. For example, if notification of state 3 is to be restored, the server end 118 may generate a blockchain transaction to restore state 3 in the another cyclic trigger flow of the one or more states of the workflow as shown in FIG. 3C (e.g., by removing the shortcut and restore the original connection), and transmit the blockchain transaction to one or more blockchain nodes to add to the blockchain. Once the blockchain transaction is added to the blockchain, state 3 will be restored in the cyclic trigger flow of the one or more states of the workflow in FIG. 3C. The server end 118 may further restore local state L3 in the cyclic trigger flow of the one or more local states as shown in FIG. 3B (e.g., by removing the shortcut). As a result, notification of state 3 is effectively resumed. Thus, the one state is configurable to be restored in the another cyclic trigger flow registered in the blockchain in response to reactivating notification of the one state, and the local state mapped to the one state is configurable to be restored in the cyclic trigger flow maintained locally in response to reactivating notification of the one state.

In some embodiments, the sub-states may be banned and revived similarly to the states. In one embodiment, the server end 118 may obtain a request for deactivating one of the one or more sub-states. In response to the request for deactivating the one sub-state, the server end 118 may generate a blockchain transaction for shortcutting the one sub-state from the another cyclic trigger flow registered in the blockchain, and transmit the generated blockchain transaction to one or more blockchain nodes to add to the blockchain. The server end 118 may further shortcut a local sub-state mapped to the one sub-state from the cyclic trigger flow maintained locally. In this way, the server end 118 may effectively cease notification of the one sub-state to its subscriber.

In one embodiment, the server end 118 may obtain a request for reactivating the one sub-state. In response to the request for reactivating the one sub-state, the server end 118 may generate a blockchain transaction for restoring the one sub-state in the another cyclic trigger flow registered in the blockchain, and transmit the generated blockchain transaction to one or more blockchain nodes to add to the blockchain. The server end 118 may further restore the local sub-state mapped to the one sub-state in the cyclic trigger flow maintained locally. In this way, the server end 118 may effectively resume notification of the one sub-state to its subscriber.

As such, through the platform provided by the server end 118, participants to workflows can subscribe to respective states that they are concerned with and configure and subscribe to sub-states for their own use. The task of obtaining information from blockchain, determining state trigger, and arranging message delivery can be centralized at the platform in an efficient manner, thus minimizing the overall computation commitment and energy consumption. The platform also provides customization and privacy protection for its users. With the platform, workflows similar to the purchase-delivery of items can be simultaneously handled for efficient subscription and notification.

Figure 4A:
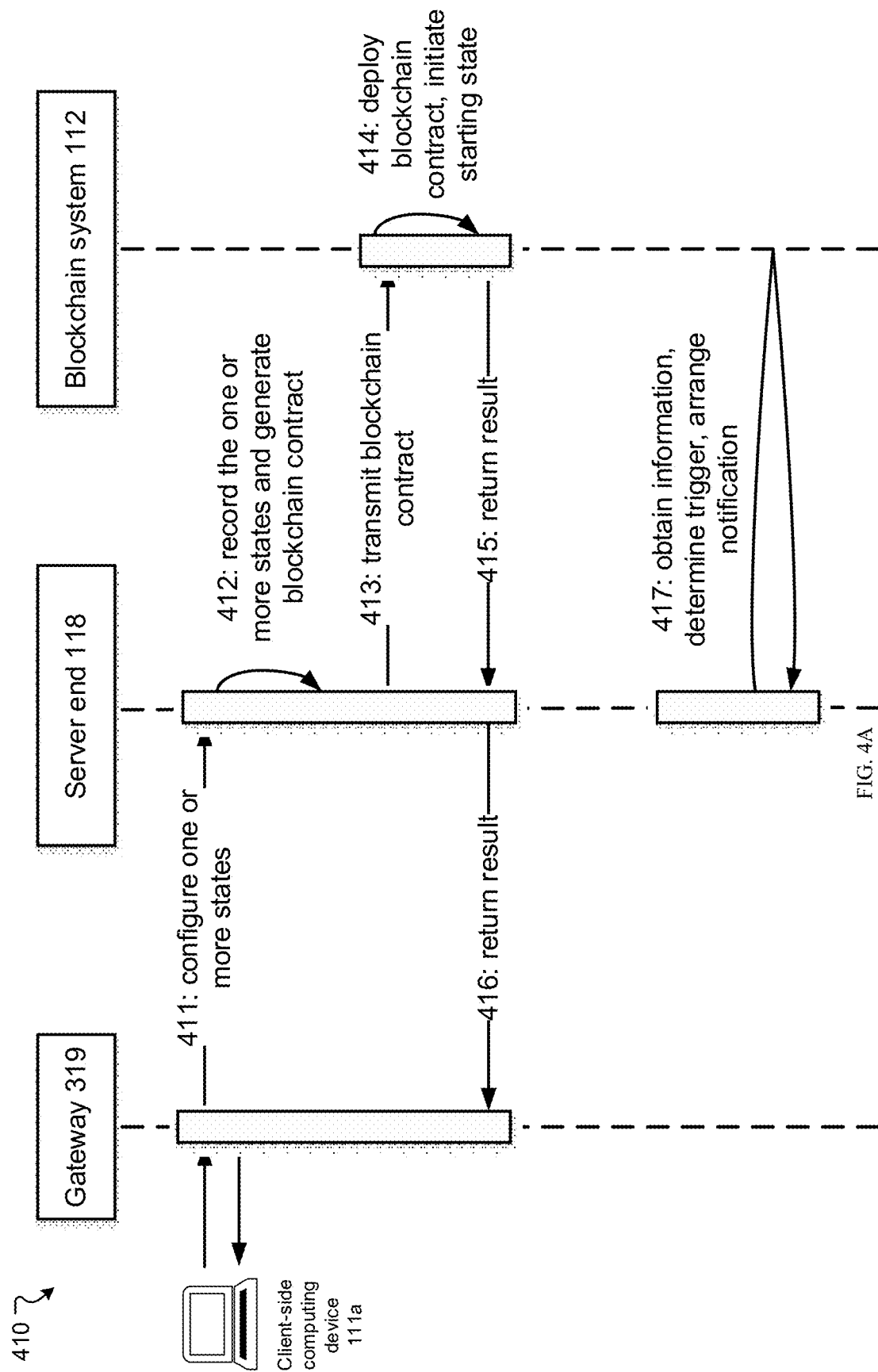
FIG. 4A illustrates a flowchart of a method for registering subscribable states in blockchain in accordance with some embodiments.

FIG. 4A illustrates a flowchart of a method 410 for registering subscribable states in blockchain in accordance with some embodiments. The operations of method 410 presented below are intended to be illustrative. Depending on the implementation, the method 410 may include additional, fewer, or alternative steps performed in various orders or in parallel. The method 410 may correspond to various steps described above with reference to FIG. 3A to FIG. 3C. Further details of the method 410 can be referred to FIG. 1 to FIG. 3C and related descriptions above.

In some embodiments, at step 411, through an optional gateway 319, the client-side computing device 111*a* may communicate with the server end 118 to configure one or more states of a workflow. For example, the client-side computing device 111a may define a workflow and states of the workflow and configure a cyclic trigger flow of the states, such as the cyclic trigger flow of states 1, 2, 3, and 4 as shown in FIG. 3C. One of the states may be designated as a starting state, and one of the states may be designated as an ending state. Once designated, the starting state and end state may not be altered. At a given time, the workflow may be in one of the states.

At step 412, the server end 118 may record the one or more states and generate a blockchain contract comprising the workflow. For example, the server end 118 may configure a locally-maintained state machine comprising one or more local states respectively mapped to the one or more states. Thus, the local states may possess a similar cyclic trigger flow. The server end 118 may further generate the blockchain contract that defines the workflow, the states, and the cyclic trigger flow.

At step 413, the server end 118 may include the blockchain contract in a blockchain transaction and transmit the blockchain transaction to one or more blockchain nodes of the blockchain system 112.

At step 414, the blockchain nodes of the blockchain system 112 may verify the blockchain transaction to add it to the blockchain. Once added, the blockchain contract is deployed in the blockchain. An algorithm included in the blockchain transaction may initiate the current state of the workflow in the initially deployed blockchain transaction to be the starting state.

At step 415, the blockchain system 112 may return a deployment result to the server end 118. Accordingly, the state machine may be initiated to be in a starting local state mapped to the starting state. At step 416, the server end 118 may report to the client-side computing device 111a about the deployment result.

At step 417, the server end 118 may start obtaining information from the blockchain. For example, whenever a new block is added to the blockchain, the server end 118 may obtain information from the new block and search its blockchain transactions for updates with respect to the deployed blockchain contract. If there is a change in the state of the deployed blockchain contract, which corresponds to a change in the state of the workflow, the server end 118 may update the local state machine. According to the state of the state machine, the server end 118 may determine if notification should be triggered. For example, if a certain state is subscribed by a subscriber and the state machine has switched to a local state corresponding the certain state, the server end 118 may place a corresponding notification message in a message queue for the subscriber to obtain the notification message. Alternatively, the server end 118 may send the notification message to the subscriber's computing device.

Figure 4B:
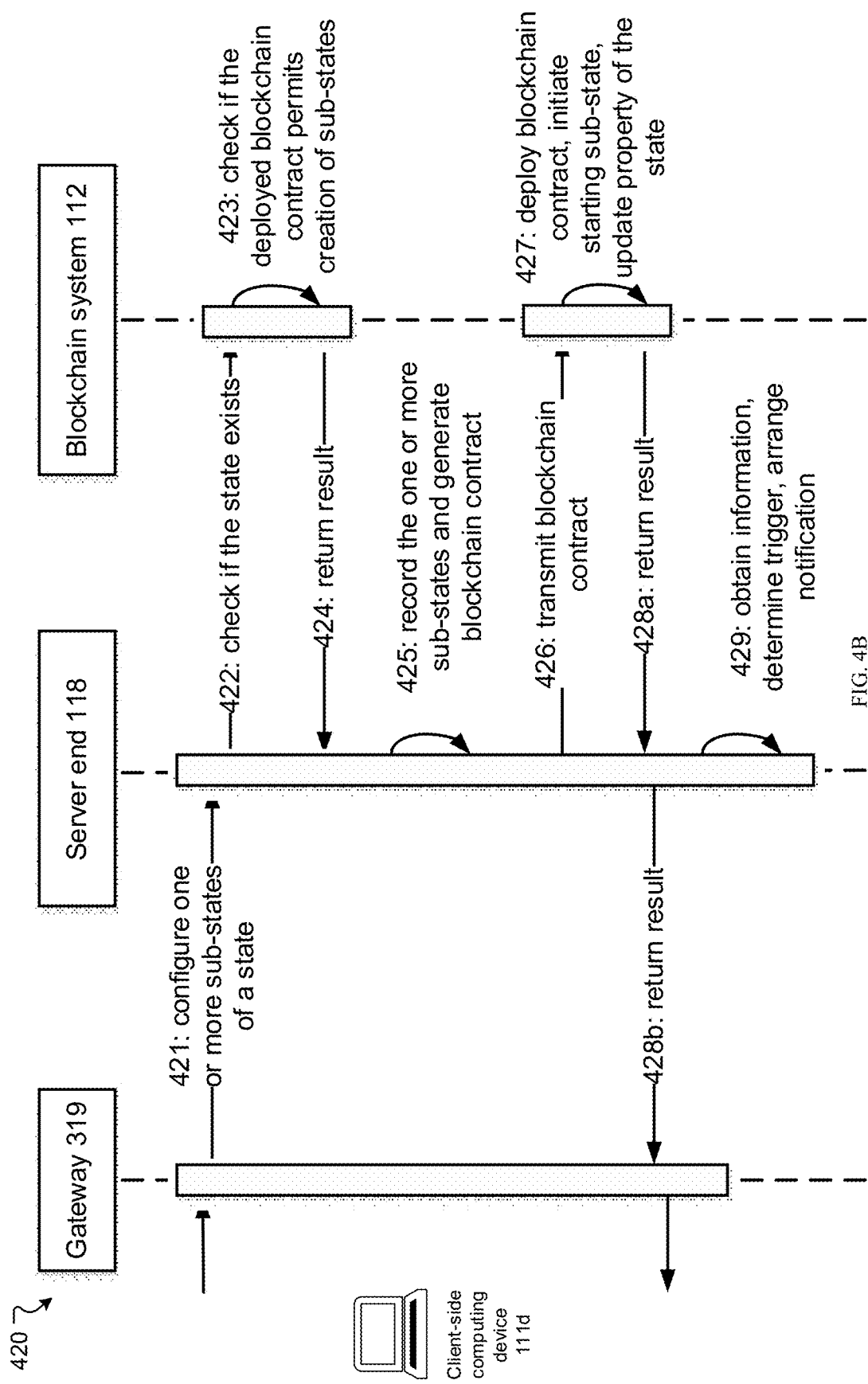
FIG. 4B illustrates a flowchart of a method for registering subscribable sub-states in blockchain in accordance with some embodiments.

FIG. 4B illustrates a flowchart of a method 420 for registering subscribable sub-states in blockchain in accordance with some embodiments. The operations of method 420 presented below are intended to be illustrative. Depending on the implementation, the method 420 may include additional, fewer, or alternative steps performed in various orders or in parallel. The method 420 may correspond to various steps described above with reference to FIG. 3A to FIG. 3C. Further details of the method 420 can be referred to FIG. 1 to FIG. 3C and related descriptions above.

In some embodiments, at step 421, through an optional gateway 319, the client-side computing device 111d may communicate with the server end 118 to configure one or more sub-states of a state of a workflow. The workflow may have been registered in a blockchain and comprised in a deployed blockchain contract. For example, the client-side computing device 111d may define one or more sub-states of a registered state and configure a cyclic trigger flow of the state and the sub-states, such as the cyclic trigger flow of state 4, and sub-states 41, 42, and 43 as shown in FIG. 3C. The order of the state and the sub-states in the cyclic trigger flow may be designated. Within the cyclic trigger flow, at a given time, the workflow may be in the state or one of the sub-states.

At step 422, the server end 118 may check if the state exists in the blockchain. For example, the server end 118 may query the blockchain system 112 to determine if the registered state and the deployed blockchain contract comprising the registered state exist in the blockchain.

At step 423, if the state exists, the blockchain system 112 may check if the deployed blockchain contract permits creation of the one or more sub-states. For example, the administrator may have permitted or prohibited sub-state creation for certain states when registering the states. At step 424, the blockchain system 112 may return check results to the server end 118.

At step 425, the server end 118 may record the one or more sub-states and generate a blockchain contract comprising the one or more sub-states. For example, the server end 118 may configure a locally-maintained state machine comprising one or more local sub-states respectively mapped to the one or more sub-states. The server end 118 may further generate the blockchain contract that defines the one or more sub-states with respect to the state and defines the cyclic trigger flow. A starting sub-state may be initiated to be the first sub-state to become current when the state becomes current.

At step 426, the server end 118 may include the blockchain contract in a blockchain transaction and transmit the blockchain transaction to one or more blockchain nodes of the blockchain system 112.

At step 427, the blockchain nodes of the blockchain system 112 may verify the generated blockchain transaction to add it to the blockchain. Once added, the generated blockchain contract is deployed in the blockchain. An algorithm included in the blockchain transaction may initiate the current state of the workflow in the initially deployed blockchain transaction to be the starting state.

At step 428a, the blockchain system 112 may return a deployment result to the server end 118. At step 428b, the server end 118 may report to the client-side computing device 111d about the deployment result.

At step 429, the server end 118 may start obtaining information from the blockchain. For example, whenever a new block is added to the blockchain, the server end 118 may obtain information from the new block and search its blockchain transactions for updates with respect to the registered state of the workflow. If the state becomes current, the server end 118 may update the state machine and run through the cyclic trigger flow for the sub-states. According to the state of the state machine, the server end 118 may determine if notification should be triggered. For example, if a certain sub-state is subscribed by a subscriber and the state machine has switched to a local sub-state corresponding the certain sub-state, the server end 118 may place a corresponding notification message in a message queue for the subscriber to obtain the notification message. Alternatively, the server end 118 may send the notification message to the subscriber's computing device.

Figure 4C:
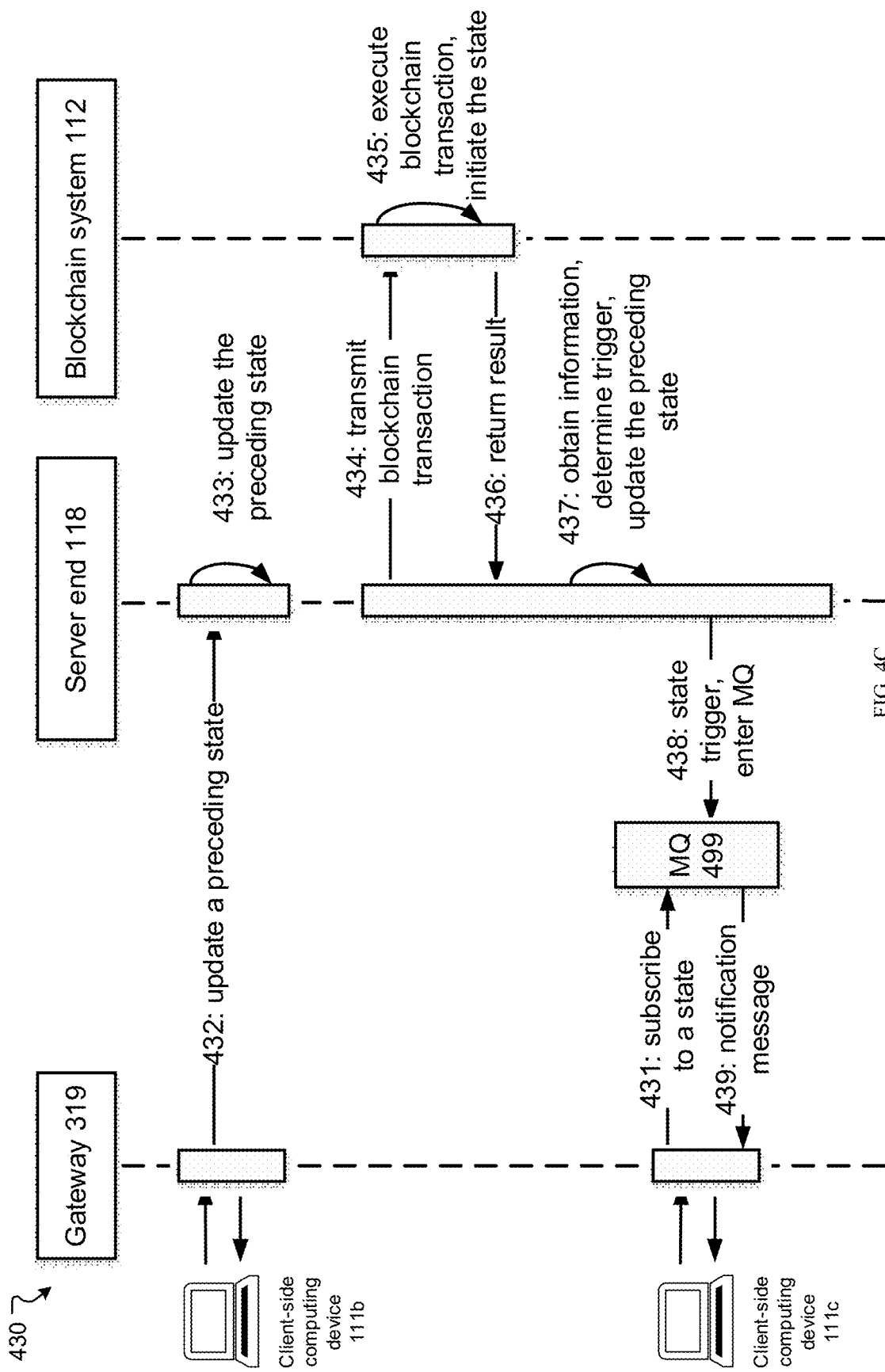
FIG. 4C illustrates a flowchart of a method for blockchain-based notification in accordance with some embodiments.

FIG. 4C illustrates a flowchart of a method 430 for blockchain-based notification in accordance with some embodiments. The operations of method 430 presented below are intended to be illustrative. Depending on the implementation, the method 430 may include additional, fewer, or alternative steps performed in various orders or in parallel. The method 430 may correspond to various steps described above with reference to FIG. 3A to FIG. 3C. Further details of the method 430 can be referred to FIG. 1 to FIG. 3C and related descriptions above.

In some embodiments, at step 431, through an optional gateway 319, the client-side computing device 111c may communicate with the server end 118 to subscribe to a state of a workflow. The subscribed state may be referred to as a second state. The second state may be triggered by a first state in the cyclic trigger flow registered in the blockchain. The workflow may have been registered in a blockchain and comprised in a deployed blockchain contract. Although state subscription and notification are described below, sub-state subscription and notification may be similarly performed. The server end 118 may store the subscription and an association between the state and the subscriber. The server end 118 may configure a message queue (MQ) 499 based on the association.

At step 432 and step 433, through an optional gateway 319, the client-side computing device 111a may communicate with the server end 118 to update the first state of the workflow. The first state may also be referred to as a preceding state to distinguish from the state that the client-side computing device has subscribed to and show relative position in the cyclic trigger flow. The first state (preceding state) may trigger the second state (the state) in the cyclic trigger flow. The server end 118 may obtain the update of the first state, that is, the preceding state of the state. In one embodiment, the client-side computing device 111b may have performed an action that updates the state of the workflow. In one example, for the online purchase-delivery event, the seller may have approved the received order and may inform the server end 118 to update the state 2 to completion.

At step 434, the server end 118 may generate a blockchain transaction for updating the first state (the preceding state), and transmitting the blockchain transaction to one or more blockchain nodes to add to the blockchain and cause the current state of the workflow to update to the one state. In one example, for the online purchase-delivery event, the server end 118 may generate a blockchain transaction for invoking the deployed blockchain contract, adding the seller's approval of the received order, and/or moving forward the workflow. From step 431 to step 434, the current state of the workflow may still be the first state, until step 435 which progresses the workflow to the second state.

At step 435, through consensus verification, the blockchain system 112 may execute the blockchain transaction to initiate the second state (the state) that is subsequent to the first state (the preceding state). For example, accordingly, the current state of the workflow in the blockchain may be updated from the first state (the preceding state) to the second state (the state) that the client-side computing device 111c subscribed to. At step 436, the blockchain system 112 may return verification and execution results to the server end 118. For example, the server end 118 may obtain from the blockchain system 112 a reply message indicating completion of the first state (the preceding state) among one or more states of the workflow.

Alternative to steps 433 to 436, the client-side computing device 111b may directly transmit a blockchain transaction to the blockchain system 112 to invoke the deployed blockchain contract and update the current state of the workflow.

At step 437, the server end 118 may obtain information from the blockchain. For example, whenever a new block is added to the blockchain, the server end 118 may obtain information from the new block and search its blockchain transactions for updates with respect to the deployed blockchain contract. If there is a change in the state of the deployed blockchain contract, which corresponds to a change in the state of the workflow, the server end 118 may update the state machine. According to the state of the state machine, the server end 118 may determine if notification should be triggered. In one example, for the online purchase-delivery event, according to the update to state 2, the workflow has progressed to state 3. Thus, the state machine may progress to local state L3.

At step 438, the server end 118 may place a corresponding notification message in the message queue 499 for the subscriber (e.g., the client-side computing device 111c) to obtain the notification message. For example, the server end 118 may place a notification message with respect to state 3 in the MQ 499. The notification message may be configured to be obtainable by the subscribers of state 3. The client-side computing device 111c may be installed with a software that listens to the MQ 499 for notification messages. Once detecting the placed notification message, at step 439, the client-side computing device 111c may obtain the notification message with respect to state 3 from the MQ 499, thus consuming the notification message. Alternatively, the server end 118 may send the notification message to the client-side computing device 111c.

FIG. 4D illustrates a flowchart of a method 440 for blockchain-based notification in accordance with some embodiments. The operations of method 440 presented below are intended to be illustrative. Depending on the implementation, the method 440 may include additional, fewer, or alternative steps performed in various orders or in parallel. The method 440 may correspond to various steps described above with reference to FIG. 3A to FIG. 3C. Further details of the method 440 can be referred to FIG. 1 to FIG. 3C and related descriptions above.

In some embodiments, steps 441 and 442 may be similar to steps 438 and 439 described above. At step 441, after a notification is triggered (e.g., for state 3), the server end 118 may place a corresponding notification message in the message queue 499 for the subscriber (e.g., the client-side computing device 111c) to obtain the notification message. For example, the server end 118 may place a notification message with respect to state 3 in the MQ 499. The notification message may be configured to be obtainable by the subscribers of state 3. The client-side computing device 111c may be installed with a software (e.g., MQ service 488) that listens to the MQ 499 for notification messages. Once detecting the placed notification message, at step 442, the client-side computing device 111c may obtain the notification message with respect to state 3 from the MQ 499, thus consuming the notification message.

At step 443, the MQ service 488 may execute a function associated with the state (e.g., state 3) in response to the obtained notification message. To execute the function, the MQ service 488 may invoke and execute one or more corresponding algorithms. For example, executing function H2 may trigger compilation of the received order in a predetermined format and automatic signing on behalf of the seller to approve the order once state 2 is current.

At step 444, the MQ service 488 may update the state (e.g., state 3). For example, the MQ service 488 may update the state's status to completion.

At step 445 and step 446, the MQ service 488 may generate and transmit a reply message to the server end 118, through an optional gateway 319. The reply message may comprise the update of the state, such as a completion status, execution results of the update, etc. Steps 445 and 446 may be similar to step 432 described above, except that the steps 445 and 446 send an update for a current state, while step 432 sends an update for a preceding state. Thus, FIG. 4C and FIG. 4D may be combined in one flow and repeated through the states of the workflow.

FIG. 5 illustrates a flowchart of an exemplary method 510 for blockchain-based notification, according to some embodiments of this specification. The method 510 may be performed by a device, apparatus, or system for blockchain-based notification (e.g., the server end 118). The method 510 may be performed by one or more components of the environment 100 of FIG. 1 (e.g., the server end 118). The server end 118 may implement Blockchain-as-a-Service (BaaS). The server end 118 may include one or more servers or other computing devices. The method 510 may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 510.

The operations of method 510 presented below are intended to be illustrative. Depending on the implementation, the method 510 may include additional, fewer, or alternative steps performed in various orders or in parallel. Further details of the method 510 can be referred to FIG. 1 to FIG. 4D and related descriptions above. The steps for blockchain-based notification described with reference to FIG. 1 to FIG. 4D are included in the method 510.

In some embodiments, before block 511, the method may include obtaining a reply message indicating completion of a preceding state among one or more states of a workflow.

In some embodiments, before block 511, the method may include obtaining an update of a preceding state of the one state, generating a blockchain transaction for updating the preceding state, and transmitting the blockchain transaction to one or more blockchain nodes to add to the blockchain and cause the current state of the workflow to update to the one state.

Block 511 includes obtaining information in a block of a blockchain to determine a current state of a workflow, wherein a blockchain contract deployed in the blockchain is executable to update the current state among one or more states of the workflow. In some embodiments, obtaining the information in the block of the blockchain to determine the current state of the workflow comprises: obtaining a blockchain transaction in one or more blocks of the blockchain, wherein the blockchain transaction triggers execution of the blockchain contract to update the current state of the workflow; and determining the current state of the workflow according to the obtained blockchain transaction.

Block 512 includes updating a locally-maintained state machine based on the determined current state. In some embodiments, the locally-maintained state machine comprises one or more local states respectively mapped to the one or more states of the workflow. In some embodiments, the one or more local states are configured in a cyclic trigger flow; and the cyclic trigger flow starts with a starting local state of the one or more local states, passes through each of the one or more local states once in one direction till an ending local state, and returns to the starting local state.

In some embodiments, the one or more states are configured in another cyclic trigger flow; the another cyclic trigger flow starts with a starting state of the one or more states, passes through each of the one or more states once in one direction till an ending state, and returns to the starting state; each of the one or more states is triggered by completion of a preceding state in the another cyclic trigger flow; the starting local state is mapped to the starting state; and before obtaining the information in the block of the blockchain to determine the current state of the workflow, the method further comprises executing the blockchain contract to initiate the current state to be the starting state.

Block 513 includes, in response to determining that the updated state machine corresponds to one of the one or more states, transmitting a notification message to one or more subscribers subscribing to the one state. In some embodiments, transmitting the notification message to the one or more subscribers subscribing to the one state comprises: placing a notification message into a message queue for one or more computing devices associated with the one or more subscribers to obtain the notification message. In some embodiments, the notification message includes a message indicating that the one state is current. In some embodiments, the notification message includes a result returned from completion of a preceding state among the one or more states.

In some embodiments, the method further comprises: obtaining a request for deactivating the one state; and in response to the request for deactivating the one state: generating a blockchain transaction for shortcutting the one state from the another cyclic trigger flow, and transmitting the generated blockchain transaction to one or more blockchain nodes to add to the blockchain; and shortcutting a local state mapped to the one state from the cyclic trigger flow.

In some embodiments, the method further comprises: obtaining a request for reactivating the one state; and in response to the request for reactivating the one state: generating a blockchain transaction for restoring the one state in the another cyclic trigger flow, and transmitting the generated blockchain transaction to one or more blockchain nodes to add to the blockchain; and restoring the local state mapped to the one state in the cyclic trigger flow.

In some embodiments, the current state is configurable by a subscriber of one or more sub-states to comprise the one or more sub-states; and the method further comprises: establishing an association between the subscriber and the one or more sub-states for transmitting notifications associated with the one or more sub-states to the subscriber. In some embodiments, the one or more sub-states form a cyclic trigger flow; the current state is public to the one or more subscribers; and the one or more sub-states are private to the subscriber of the one or more sub-states.

Figure 6:
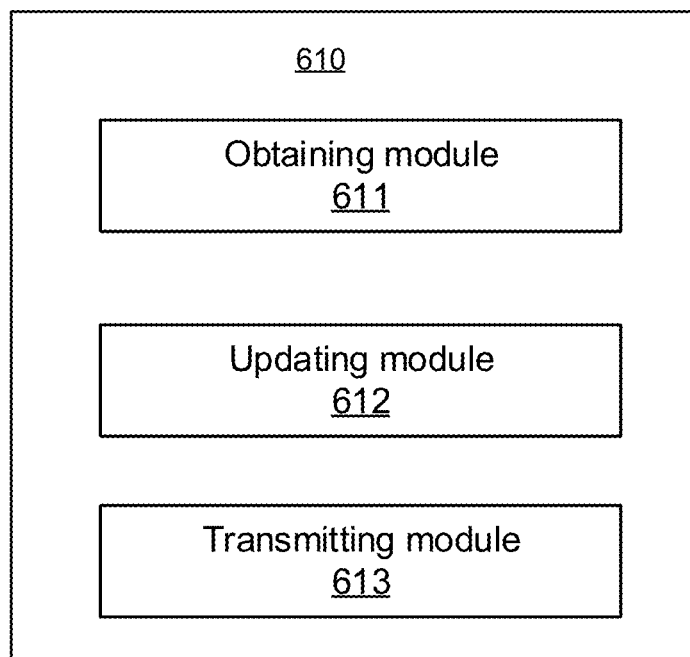
FIG. 6 illustrates a block diagram of an apparatus for blockchain-based notification in accordance with some embodiments.

FIG. 6 illustrates a block diagram of a system 610 for blockchain-based notification in accordance with some embodiments. The system 610 (e.g., a computer system) may be an example of an implementation of the server end 118 described above, a similar device or system of devices, or a combination of the server end 118 and one or more additional devices. For example, the method 430 and/or method 510 may be implemented by the system 610. The system 610 may comprise one or more processors and one or more non-transitory computer-readable storage media (e.g., one or more memories) coupled to the one or more processors and configured with instructions executable by the one or more processors to cause the system or device (e.g., the processor) to perform the methods and operations described above, e.g., the method 430, the method 510. The system 610 may comprise various units/modules corresponding to the instructions (e.g., software instructions).

In some embodiments, the system 610 may be referred to as an apparatus for blockchain-based notification. The apparatus may include: an obtaining module 611 for obtaining information in a block of a blockchain to determine a current state of a workflow, wherein a blockchain contract deployed in the blockchain is executable to update the current state among one or more states of the workflow; an update module 612 for updating a locally-maintained state machine based on the determined current state; and a transmitting module 613 for, in response to determining that the updated state machine corresponds to one of the one or more states, transmitting a notification message to one or more subscribers subscribing to the one state.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
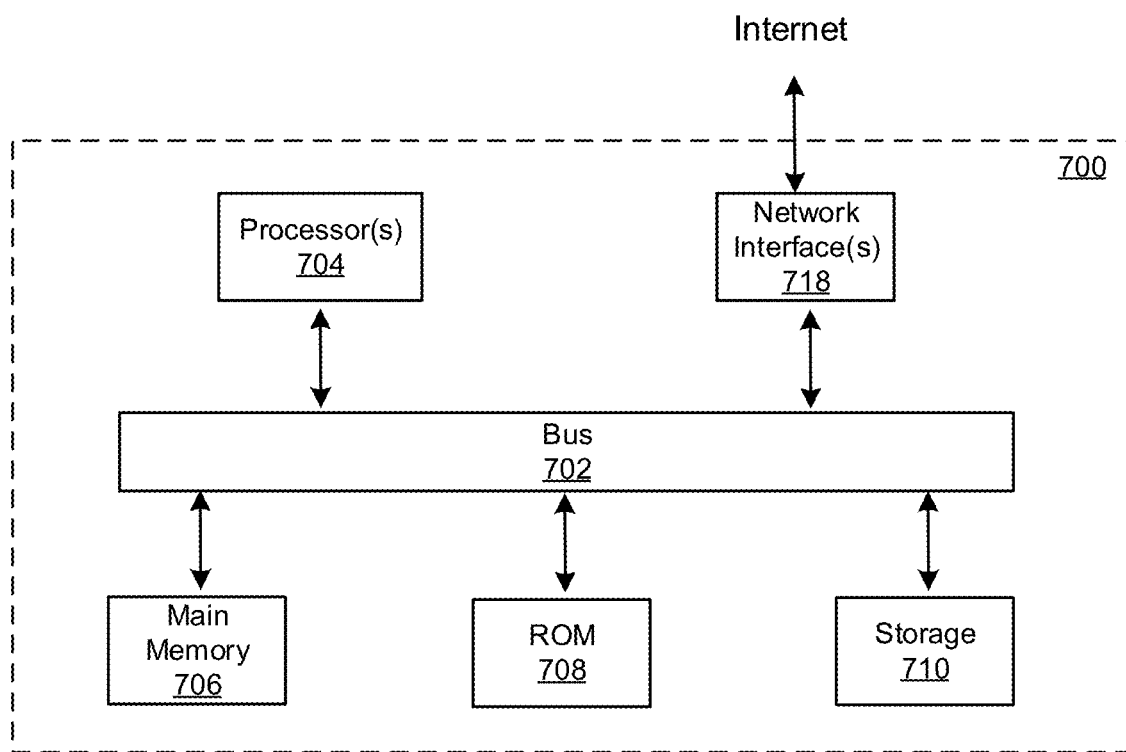
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the method 430 and related steps, the method 510 and related steps). The system 700 may be implemented in any of the systems described herein (e.g., the system 610, the server end 118). The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented method for blockchain-based notification, comprising:
    obtaining information in a block of a blockchain to determine a current state of a workflow, wherein a blockchain contract deployed in the blockchain is executable to update the current state among one or more states of the workflow;
    updating a locally-maintained state machine based on the determined current state wherein:
        the locally-maintained state machine comprises one or more local states respectively mapped to the one or more states of the workflow;
        the one or more local states are configured in a cyclic trigger flow;
        the one or more states are configured in another cyclic trigger flow;
        the another cyclic trigger flow starts with a starting state of the one or more states, passes through each of the one or more states once in one direction till an ending state, and returns to the starting state;
        each of the one or more states is triggered by completion of a preceding state in the another cyclic trigger flow;
        the starting state is mapped to a starting local state of the cyclic trigger flow; and
        before obtaining the information in the block of the blockchain to determine the current state of the workflow, the method further comprises executing the blockchain contract to initiate the current state to be the starting state; and
    in response to determining that the updated state machine corresponds to one of the one or more states, transmitting a notification message to one or more subscribers subscribing to the one state.

2. The method of claim 1, wherein obtaining the information in the block of the blockchain to determine the current state of the workflow comprises:
    obtaining a blockchain transaction in one or more blocks of the blockchain, wherein the blockchain transaction triggers execution of the blockchain contract to update the current state of the workflow; and
    determining the current state of the workflow according to the obtained blockchain transaction.

3. The method of claim 1, before obtaining the information in the block of the blockchain to determine the current state of the workflow, further comprising:

obtaining a reply message indicating completion of a preceding state among the one or more states.

4. The method of claim 1, before obtaining the information in the block of the blockchain to determine the current state of the workflow, further comprising:
obtaining an update of a preceding state of the one state;
generating a blockchain transaction for updating the preceding state; and
transmitting the blockchain transaction to one or more blockchain nodes to add to the blockchain and cause the current state of the workflow to update to the one state.

5. The method of claim 1, wherein:
the notification message includes a message indicating that the one state is current and a result returned from completion of a preceding state among the one or more states.

6. The method of claim 1, wherein:
the cyclic trigger flow associated with the one or more local states starts with the starting local state of the one or more local states, passes through each of the one or more local states once in one direction till an ending local state, and returns to the starting local state.

7. The method of claim 6, further comprising:
obtaining a request for deactivating the one state; and
in response to the request for deactivating the one state:
generating a blockchain transaction for shortcutting the one state from the another cyclic trigger flow, and transmitting the generated blockchain transaction to one or more blockchain nodes to add to the blockchain; and
shortcutting a local state mapped to the one state from the cyclic trigger flow.

8. The method of claim 7, further comprising:
obtaining a request for reactivating the one state; and
in response to the request for reactivating the one state:
generating a blockchain transaction for restoring the one state in the another cyclic trigger flow, and transmitting the generated blockchain transaction to one or more blockchain nodes to add to the blockchain; and
restoring the local state mapped to the one state in the cyclic trigger flow.

9. The method of claim 1, wherein:
the current state is configurable by a subscriber of one or more sub-states to comprise the one or more sub-states; and
the method further comprises: establishing an association between the subscriber and the one or more sub-states for transmitting notifications associated with the one or more sub-states to the subscriber.

10. The method of claim 9, wherein:
the one or more sub-states form a cyclic trigger flow;
the current state is public to the one or more subscribers; and
the one or more sub-states are private to the subscriber of the one or more sub-states.

11. The method of claim 1, wherein transmitting the notification message to the one or more subscribers subscribing to the one state comprises:
placing a notification message into a message queue for one or more computing devices associated with the one or more subscribers to obtain the notification message.

12. A system for blockchain-based notification, the system comprising one or more processors and one or more non-transitory computer-readable memories coupled to the one or more processors and configured with instructions executable by the one or more processors to cause the system to perform operations comprising:
obtaining information in a block of a blockchain to determine a current state of a workflow, wherein a blockchain contract deployed in the blockchain is executable to update the current state among one or more states of the workflow;
updating a locally-maintained state machine based on the determined current state wherein:
the locally-maintained state machine comprises one or more local states respectively mapped to the one or more states of the workflow;
the one or more local states are configured in a cyclic trigger flow;
the one or more states are configured in another cyclic trigger flow;
the another cyclic trigger flow starts with a starting state of the one or more states, passes through each of the one or more states once in one direction till an ending state, and returns to the starting state;
each of the one or more states is triggered by completion of a preceding state in the another cyclic trigger flow;
the starting state is mapped to a starting local state of the cyclic trigger flow; and
before obtaining the information in the block of the blockchain to determine the current state of the workflow, the operations further comprise executing the blockchain contract to initiate the current state to be the starting state; and
in response to determining that the updated state machine corresponds to one of the one or more states, transmitting a notification message to one or more subscribers subscribing to the one state.

13. The system of claim 12, wherein obtaining the information in the block of the blockchain to determine the current state of the workflow comprises:
obtaining a blockchain transaction in one or more blocks of the blockchain, wherein the blockchain transaction triggers execution of the blockchain contract to update the current state of the workflow; and
determining the current state of the workflow according to the obtained blockchain transaction.

14. The system of claim 12, wherein, before obtaining the information in the block of the blockchain to determine the current state of the workflow, the operations further comprise:
obtaining a reply message indicating completion of a preceding state among the one or more states.

15. A non-transitory computer-readable storage medium for blockchain-based notification, the storage medium configured with instructions executable by one or more processors to cause the one or more processors to perform operations comprising:
obtaining information in a block of a blockchain to determine a current state of a workflow, wherein a blockchain contract deployed in the blockchain is executable to update the current state among one or more states of the workflow;
updating a locally-maintained state machine based on the determined current state wherein:
the locally-maintained state machine comprises one or more local states respectively mapped to the one or more states of the workflow;
the one or more local states are configured in a cyclic trigger flow;

the one or more states are configured in another cyclic trigger flow;

the another cyclic trigger flow starts with a starting state of the one or more states, passes through each of the one or more states once in one direction till an ending state, and returns to the starting state;

each of the one or more states is triggered by completion of a preceding state in the another cyclic trigger flow;

the starting state is mapped to a starting local state of the cyclic trigger flow; and before obtaining the information in the block of the blockchain to determine the current state of the workflow, the operations further comprise executing the blockchain contract to initiate the current state to be the starting state; and in response to determining that the updated state machine corresponds to one of the one or more states, transmitting a notification message to one or more subscribers subscribing to the one state.

16. The storage medium of claim 15, wherein obtaining the information in the block of the blockchain to determine the current state of the workflow comprises:

obtaining a blockchain transaction in one or more blocks of the blockchain, wherein the blockchain transaction triggers execution of the blockchain contract to update the current state of the workflow; and determining the current state of the workflow according to the obtained blockchain transaction.

17. The storage medium of claim 15, wherein, before obtaining the information in the block of the blockchain to determine the current state of the workflow, the operations further comprise:

obtaining a reply message indicating completion of a preceding state among the one or more states.

18. The storage medium of claim 15, wherein, before obtaining the information in the block of the blockchain to determine the current state of the workflow, the operations further comprise:

obtaining an update of a preceding state of the one state;

generating a blockchain transaction for updating the preceding state; and transmitting the blockchain transaction to one or more blockchain nodes to add to the blockchain and cause the current state of the workflow to update to the one state.

* * * * *